United States Patent [19]

Bahl et al.

[11] Patent Number: 4,827,521
[45] Date of Patent: May 2, 1989

[54] TRAINING OF MARKOV MODELS USED IN A SPEECH RECOGNITION SYSTEM

[75] Inventors: Lalit R. Bahl, Amawalk; Peter F. Brown, New York; Peter V. deSouza; Robert L. Mercer, both of Yorktown Heights, all of N.Y.

[73] Assignee: International Business Machines Corporation, Armonk, N.Y.

[21] Appl. No.: 845,201

[22] Filed: Mar. 27, 1986

[51] Int. Cl.$^4$ ................................................ G10L 5/00
[52] U.S. Cl. ................................... 381/43; 364/513.5
[58] Field of Search ...................... 381/43; 364/513.5

[56] References Cited

U.S. PATENT DOCUMENTS

| | | | |
|---|---|---|---|
| 4,038,503 | 7/1977 | Moshier et al. | 179/1 SA |
| 4,348,553 | 9/1982 | Baker et al. | 179/1 SB |
| 4,400,788 | 8/1983 | Myers et al. | 364/513 |
| 4,467,437 | 8/1984 | Tsuruta et al. | 364/513.5 |
| 4,481,593 | 11/1984 | Bahler et al. | 364/513.5 |
| 4,520,500 | 5/1985 | Mizuno et al. | 381/43 |
| 4,559,604 | 12/1985 | Ichikawa et al. | 364/513.5 |
| 4,587,670 | 5/1986 | Levinson et al. | 381/43 |
| 4,593,367 | 6/1986 | Slack et al. | 364/513 |
| 4,718,093 | 1/1988 | Brown | 381/43 |

FOREIGN PATENT DOCUMENTS 0191354 8/1986 European Pat. Off. .
0033412 8/1981 United Kingdom .

OTHER PUBLICATIONS

IBM TDB, vol. 16, No. 8, Jan. 1974, pp. 2580-2582, New York, U.S.; S. K. Das: "Segmenting and Recognizing Continuous Speech".
M. Cravero, "Phonetic Units for Hidden Markov Models", CSELT Technical Report, vol. 14, No. 2, 1986, pp. 121-125.
H. Boulard et al, "Speaker Dependent Connected Speech Recognition Via Phonemic Markov Models", IEEE, 1985, pp. 1213-1216.
D. Paul et al, "Training of HMM Recognizers by Simulated Annealing", IEEE, 1985, pp. 13-16.
B. H. Juang et al, "Recent Developments in the Application of Hidden Markov Models to Speaker-Independent Isolated Word Recognition", IEEE, 1985, pp. 9-12.
Y. Kamp et al, "State Reduction in Hidden Markov Chains Used for Speech Recognition", IEEE, 1985, pp. 1138-1145.
K. Sugawara et al, "Isolated Word Recognition Using Hidden Markov Models", IEEE, 1985, pp. 1-4.
R. Schwartz et al, "Context-Dependent Modeling for Acoustic-Phonetic Recognition of Continuous Speech", IEEE, 1985, pp. 1205-1208.
J. F. Mari et al, "Speaker Independent Connected Digit (List continued on next page.)

Primary Examiner—Emanuel S. Kemeny
Attorney, Agent, or Firm—Marc A. Block

[57] ABSTRACT

In a word, or speech, recognition system for decoding a vocabulary word from outputs selected from an alphabet of outputs in response to a communicated word input wherein each word in the vocabulary is represented by a baseform of at least one probabilistic finite state model and wherein each probabilistic model has transition probability items and output probability items and wherein a value is stored for each of at least some probability items, the present invention relates to apparatus and method for determining probability values for probability items by biassing at least some of the stored values to enhance the likelihood that outputs generated in response to communication of a known word input are produced by the baseform for the known word relative to the respective likelihood of the generated outputs being produced by the baseform for at least one other word. Specifically, the current values of counts —from which probability items are derived—are adjusted by uttering a known word and determining how often probability events occur relative to (a) the model corresponding to the known uttered "correct" word and (b) the model of at least one other "incorrect" word. The current count values are increased based on the event occurrences relating to the correct word and are reduced based on the event occurrences relating to the incorrect word or words.

21 Claims, 13 Drawing Sheets

OTHER PUBLICATIONS
Recognition Using Hidden Markov Models", Speech Tech '85, vol. 1, No. 2, pp. 127–132.

R. Schwartz et al, "Improved Hidden Markov Modeling of Phonemes for Continuous Speech Recognition", IEEE 1984, pp. 35.6.1–35.6.4.

S. Levinson et al, "Speaker Independent Isolated Digit Recognition Using Hidden Markov Models", IEEE, 1983, pp. 1049–1052.

D. M. Choy et al, "Speech Compression by Phoneme Recognition", IBM TDB, vol. 25, No. 6, Nov. 1982, pp. 2884–2886.

L. R. Bahl et al, "Interpolation of Estimators Derived From Sparse Data", IBM TDB, vol. 24, No. 4, Sep. 1981, pp. 2038–2041.

L. R. Bahl et al, "Faster Acoustic Match Computation", IBM TDB, vol. 23, No. 4, Sep. 1980, pp. 1718–1719.

R. Bakis et al, "Continuous Speech Recognition Via Centisecond Acoustic States", Research Report, 1978, pp. 1–8.

R. Bakis et al, "Spoken Word Spotting Via Centisecond Acoustic States", IBM TDB, vol. 18, No. 10, Mar. 1976, pp. 3479–3481.

FIG. 12

| PROBABILITY ITEM | θ' | CUMULATIVE COUNT (NUMERATOR) | SINGLE COUNT (NUMERATOR) | SINGLE COUNT (DENOMINATOR) |
|---|---|---|---|---|
| 1 | .02 | 7 | 1,10 | 1, 10, 25, 100, 102 |
| 2 | .15 | 8 | | |
| ...... | ...... | ...... | | |
| 9001 | .07 | 6 | | |
| ...... | ...... | ...... | | |
| 140,910 | .10 | 2 | | |

FIG. 13

| SINGLE COUNT | EXPRESSION | STORED VALUE |
|---|---|---|
| 1 | $Pr(t,S,IY,t_1,\theta')$ | .01 |
| 2 | $Pr(t,S,IY,t_2,\theta')$ | .02 |
| 3 | ...... | ...... |
| 4 | | |
| ..... | | |

TRAINING OF MARKOV MODELS USED IN A SPEECH RECOGNITION SYSTEM

TABLE OF CONTENTS

Field of the Invention
Description of Prior and Contemporaneous Art
Summary of the Invention
Brief Description of the Drawings
Description of a Preferred Embodiment of the Invention
  I. General Speech Recognition System Description
  II. Enhanced Training of Word-representing Markov Models
    A. Overview
    B. Defining Transition Probabilities and Label Output Probabilities Based on Counts
    C. Determining Values for Counts
    D. The Baum-Welch Algorithm
    E. Detailed Match
    F. Approximate Fast Match
    G. Constructing Phonetic Baseforms
    H. Alternative Embodiments
Table 1
Table 2
Claims

FIELD OF THE INVENTION

The present invention relates to the field of training, i.e. determining probabilities and statistics, for probabilistic acoustic models which may be used in characterizing words in a speech recognition system.

DESCRIPTION OF PRIOR AND CONTEMPORANEOUS ART

Markov modelling is a probabilistic technique employed in various fields, including speech recognition. Generally, a Markov model is represented as a plurality of states, transitions which extend between states, and probabilities relating to the occurrence of each transition and to the occurrence of an output (from a set of predefined outputs) at each of at least some of the transitions.

Although the general motion of Markov models is known, specific methodologies and implementations of Markov modelling which adapt it for use in speech recognition are the subject of continuing research. A number of articles discuss the employment of Markov modelling in an experimental speech recognition context. Such articles include: "Continuous Speech Recognition by Statistical Methods" by F. Jelinek, *Proceedings of the IEEE*, volume 64, No. 4, 1976 and in an article of L. R. Bahl, F. Jelinek, and R. L. Mercer entitled "A Maximum Likelihood Approach to Continuous Speech Recognition", *IEEE Transactions on Pattern Analysis and Machine Intelligence*, volume PAMI-5, No. 2, March 1983. These articles are incorporated herein by reference.

In an experimental probabilistic approach to speech recognition which employs Markov (or similar) models, an acoustic waveform is initially transformed into a string of labels. The labels, each of which identifies a sound type, are selected from an aliphabet of distinct labels. A Markov model is assigned to each word. As with other Markov models, the "word models" include (a) a plurality of states (starting at an initial state and ending at a final state) and (b) transitions, each transition extending from a state to a state. For each word model, or "baseform", there is means for storing values that reflect (a) probabilities corresponding to transitions and (b) label output probabilities. Each label output probability is intended to correspond to the likelihood of a given label being produced at a given transition.

The process of generating statistics and determining the probabilities for a Markov model is referred to as "training". In performing word model training, it is typical that a training script of known utterances—hereafter considered utterances of words in a vocabulary—be spoken by a system user into an acoustic processor. The acoustic processor generates a string of labels in response to the utterance by the user of known words. From the labels generated in response to the utterance of the training script, statistics are generated and probabilities are determined therefrom.

One approach to training, referred to as "maximum likelihood training", is employed generally in Markov modelling. According to this approach, statistics are found which maximize the likelihood that the training data is generated. That is, given a string A of labels $a_1 a_2$—and a Markov model M, statistics are sought which maximize the expression $Pr(A/M)$. In the maximum likelihood approach, the statistics of the model M are defined as that the probability of the string A given the Model M is maximized. This approach provides reasonably accurate results.

However, the maximum likelihood approach is not specifically directed toward maximizing word decoding accuracy. Since word models are approximate, there is a difference between defining statistics which maximize the probability of A given M and statistics which maximize the accuracy of providing the correct word for a spoken input. As a result of this discrepancy, word models trained with reliance on only the maximum likelihood approach suffer from some inaccuracy.

In that the accuracy of a probabilistic speech recognization system depends greatly on the accuracy of the word models—including the probability values embodied therein—it is critical that the accuracy of the word models be as high as can be reasonably achieved.

SUMMARY OF THE INVENTION

The present invention has as an object the training of Markov models, and similar models, preferably in a speech recognition environment in a manner directed toward maximizing word decoding accuracy. Specifically, the present invention is directed to determining statistics for each model in a manner which enhances the probability of the correct word relative to the probabilities associated with other words. The philosophy is to maximize the difference between the probability of the correct script of uttered words given the label outputs and the probability of any other (incorrect) script, rather than maximizing the probability of the labels given the script as in other approaches.

In achieving the above object, an embodiment of the present invention provides—in a system for decoding a vocabulary word from outputs selected from an alphabet of outputs in response to a communicated word input wherein each word in the vocabulary is represented by a baseform of at least one probabilistic finite state model and wherein each probabilistic model has transition probability items and output probability items and wherein a value is stored for each of at least some probability items—a method of determining probability item values comprising the step of biasing at least some of the stored values to enhance the likelihood that outputs generated in response to communication of a known word input are produced by the baseform for the known word relative to the respective likelihood of the generated outputs being produced by the baseform for at least one other word.

Each word model, it is noted, is preferably represented by one or more probabilistic finite state machines in sequence. Each machine corresponds to a "phone" from a set of phones. Each phone correlates to a phonetic element, a label (or feneme), or some other predefined characterization of speech for which a Markov model or the like can be specified.

The training script is typically composed of a series of known words, wherein each word constitutes a sequence of phones and wherein each word can, therefore, be represented by a sequence of phone machines.

In accordance with the invention, probability values associated with the probability items are evaluated as follows. For each probability item, there is a set estimate value $\theta'$.

Given the estimated values $\theta$ and the labels generated during training, values referred to as "single counts" are determined. A "single count" in general relates to the (expected) number of times an event occurred based on training data. One specific definition of a "single count" is the probability of a particular transition $\tau_i$ and state $S_j$ given (a) a certain string Y of labels, (b) defined estimated values $\theta'$, and (c) a particular time, t.

The above-described single counts are determined by applying the well-known forward-backward algorithm, or Baum-Welch algorithm.

According to the above definition, the single count may be represented by the expression:

$$\Pr(S_j,\tau_i|Y,\theta',t)$$

By summing the single counts for a specific $S_j,\tau_i,Y,\theta'$ for each time t, a "transition cumulative count" is determined for a corresponding transition probability item. Because the transition cumulative count is a sum of probabilities, its value may exceed unity. For each transition probability item, a respective transition probability item is preferably stored. By dividing this cumulative count from a given transition by the sum of cumulative counts for all transitions which can be taken from state $S_j$, a current probability value for the respective transition probabilty item is determined. The current probability value is preferably stored and associated with its respective transition probability item.

With regard to label output probability items, single counts are again summed. For each of these probability items, a sum is made of the single counts for a specific $S_j,\tau_i$, Y, and $\theta'$, for all label times at which the corresponding generated label in the string is the label corresponding to the label output probability item. The sum in this case is a "label output cumulative count" and is preferably stored associated with the label output probability item corresponding therewith. By dividing this cumulative count by the sum of single counts over all label times for the specific $S_j$, f, $\tau_i$, Y, and $\theta'$, a current probability value is determined for the respective label output probability item.

The present invention is directed to improving the above-described current values of probability items in order to enhance word decoding accuracy in a probabilistic word, or more specifically speech, recognition system.

In accordance with the invention, a training script of uttered known words, an initial probability value for each probability item and a list of candidate words for each word uttered during training are prescribed. The list of candidate words is defined by a procedure such as the matching procedures set forth U.S. Pat. No. 4,718,094. For any known uttered word there is the "correct" known word and an "incorrect" word (preferably the incorrect word having the highest likelihood of being wrongly decoded as the known word). The current probability values of the probability items are determined by first computing a "plus count value" and a "minus count value" for each probability item in the correct word baseform or incorrect word baseform.

The plus count value is added to and the minus count value is subtracted from the cumulative count for the corresponding probability item (for each probability item). Based on these adjusted cumulative counts, the probability values for the probability items are recomputed and stored. A "plus" count value is computed for each probability item in the word baseform of the correct (i.e. known) word by applying the well-known forward-backward algorithm and preferably scaling the statistics resulting therefrom. This summation biases the count values (and probability items derived therefrom) in favor of the string Y, making Y appear to a relatively more likely output of the correct word model.

The minus count value for a given probability item is computed by applying the forward-backward algorithm as if the incorrect word was spoken to produce the string of labels. The minus count value derived from the single utterance of the known word is subtracted from the most recent value of the corresponding cumulative count (before or after summation with the "plus" count value). This subtraction biases a cumulative count used in computing a probability item in the incorrect word baseform away from the string Y.

By following the above steps for each word in the vocabulary, the stored values for counts and probability values are adjusted to enhance decoding accuracy.

It is therefore an object of the above-outlined present invention to determine probabilities and statistics which converge toward zero decoding errors.

Also, it is an object of the invention to improve count values which are determined by other techniques in order to improve the decoding of speech into recognized words in a vocabulary.

BRIEF DESCRIPTION OF THE DRAWINGS

FIG. 12 is a table setting forth probability items and counts.

FIG. 13 is a table showing single count information.

DESCRIPTION OF A PREFERRED EMBODIMENT OF THE INVENTION

The following case relates to an invention which provides background or environment for the present invention and is incorporated herein by reference to the extent, if any, required for supporting the description of the present invention: U.S. Pat. No. 718,094. Performing Acoustic Matching", Ser. No. 06/672974 filed Nov. 19, 1984.

I. General Speech Recognition System Description

Figure 1:
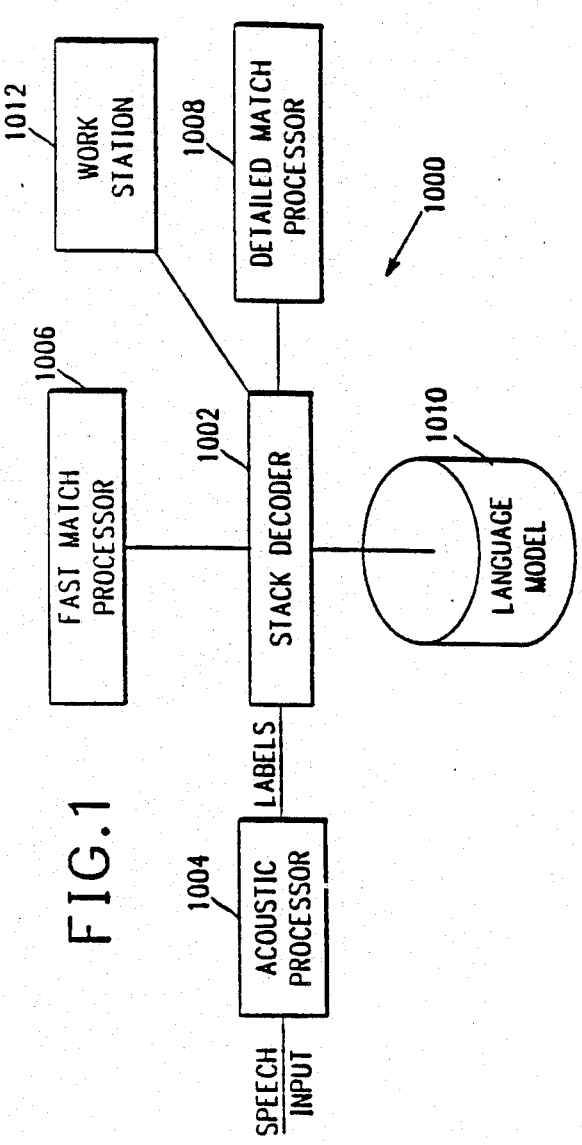
FIG. 1 is a block diagram illustrating a speech recognition system in which the present invention is implemented.

In FIG. 1, a general block diagram of a speech recognition system 1000 is illustrated. The system 1000 includes a stack decoder 1002 to which are connected an acoustic processor (AP) 1004, an array processor 1006 used in performing a fast approximate acoustic match, an array processor 1008 used in performing a detailed acoustic match, a language model 1010, and a work station 1012.

The acoustic processor 1004 is designed to transform a speech waveform input into a string of labels, each of which in a general sense identifies a corresponding sound type. In the present system, the acoustic processor 1004 is based on a unique model of the human ear and is described in a patent application entitled "Nonlinear Signal Processing in a Speech Recognition System", Ser. No. 06/665401 filed Oct. 26, 1984. This co-pending and commonly assigned application is incorporated herein by reference to disclose a particularly effective method of generating labels in response to incoming speech.

Figure 2:
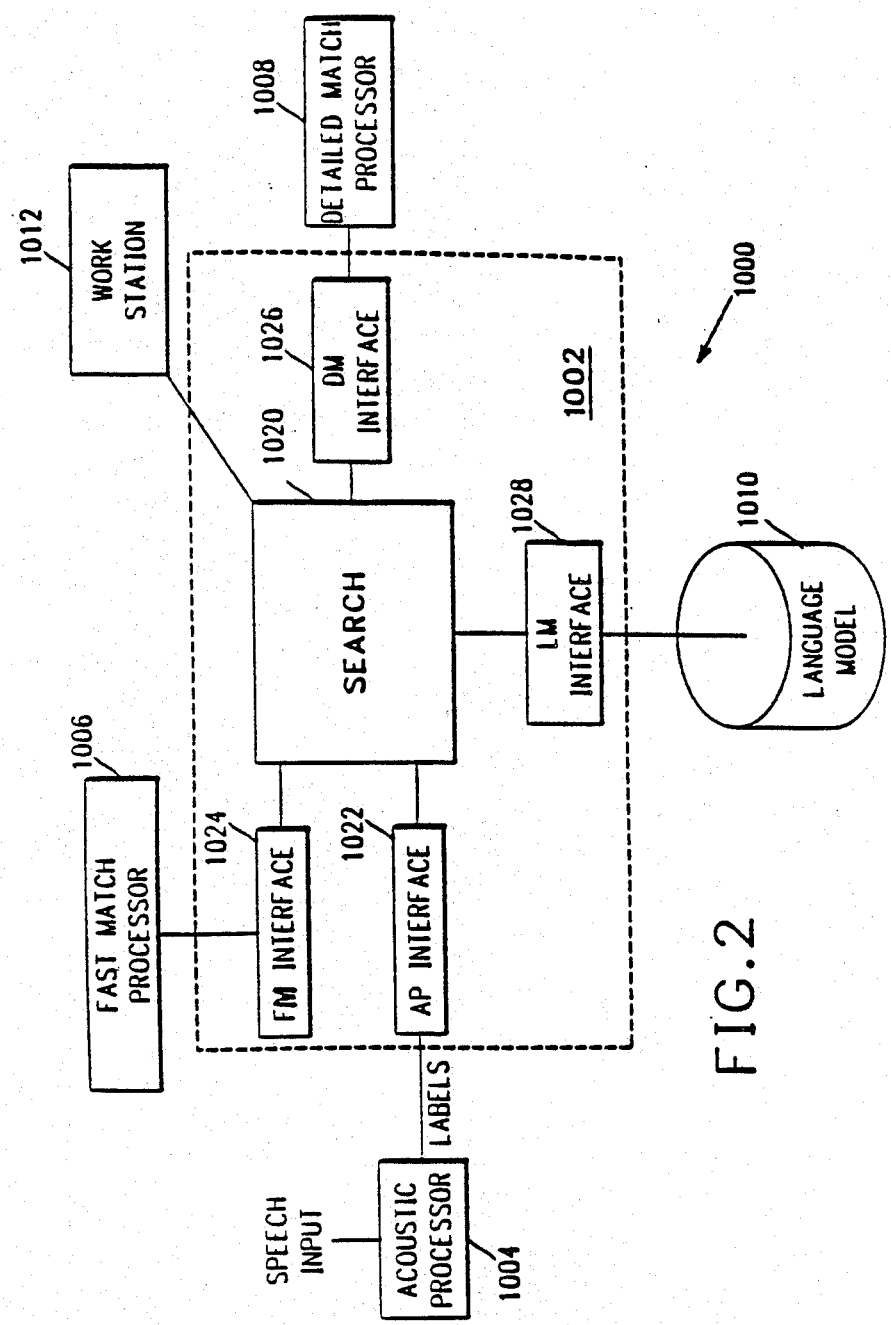
FIG. 2 is a block diagram showing further details of the system of FIG. 1.

The labels (also referred to herein as "fenemes") from the acoustic processor 1004 enter the stack decoder 1002. In a logical sense, the stack decoder 1002 may be represented by the elements shown in FIG. 2. That is, the stack decoder 1002 includes a search element 1020 which communicates with the work station 1012 and which communicates with the acoustic processor process, the fast match processor process, the detailed match process, and the language model process through respective interfaces 1022, 1024, 1026, and 1028.

In operation, fenemes generated by the acoustic processor 1004 are communicated by the search element 1020 to the fast match processor 1006. The detailed match and fast match procedures are described hereinbelow as well as in the U.S. Pat. No. 4,718,094. Briefly, the object of acoustic matching is to determine—based on acoustics—the most likely word (or words) for a given string of labels. In achieving this end, each word is represented by at least one probabilistic finite state machine. Typically, each word is represented by a sequence of such machines.

Each probabilistic finite state machine is characterized by (a) a plurality of states $S_i$, (b) a plurality of transitions $tr(S_j|S_i)$, some of the transitions extending from one state to a different state and some extending from a state back to itself, each transition having associated therewith a corresponding probability, and (c) for each label that can be generated at a particular transition, a corresponding actual label probability. Equivalently, and for convenience, a number of transitions may be grouped together—as if a single transition—with a single set of label output probabilities being associated therewith.

The probabilities which fill the machines are determined based on data derived during a training session in which a training script is uttered by a user. The data derived corresponds to the user's particular speech characteristics.

Employing word models (i.e., word baseforms) which have been trained, the fast approximate acoustic match is performed to examine words in a vocabulary of words and to reduce the number of candidate words for a given string of incoming labels. In accordance with the fast match, approximations are made for at least some of the probability values. Matching is then performed based on the approximated probability values.

The language model 1010 determines the contextual likelihood of each of various words—such as the candidate words in the fast match candidate list—based preferably on existing tri-grams. This approach is reported, in general, in the literature.

The detailed match is operable alone or in conjunction with the fast match. When operated alone, unapproximated probability values corresponding to each word model are considered in determining the match score of the corresponding word. The detailed match examines and provides a score for each vocabulary word.

When used in conjunction with the fast match, the detailed match examines those words from the fast match candidate list which have a reasonable likelihood of being the spoken word and which, preferably, have a reasonable likelihood based on the language model computations.

The word, or words, derived from the acoustic matching and the language model are used by the stack decoder 1002. Specifically, the stack decoder 1002—using information derived from the fast matching, detailed matching, and applying the language model—is designed to determine the most likely path, or sequence, of words for a string of generated labels.

Two prior art approaches for finding the most likely word sequence are Viterbi decoding and single stack decoding. Each of these techniques are described in an article by Bahl, Jelinek, and Mercer entitled, "A Maximum Likelihood Approach to Continuous Speech Recognition," *IEEE Transactions on Pattern Analysis and Machine Intelligence*, Volume PAMI-5, No. 2, pp. 179–190 (1983). Viterbi decoding is described in section V and single stack decoding in section VI of the article.

In the single stack decoding technique, paths of varying length are listed in a single stack according to likelihood and decoding is based on the single stack. Single stack decoding must account for the fact that likelihood is somewhat dependent on path length and, hence, normalization is generally employed.

The Viterbi technique does not require normalization and is generally practical for small tasks.

The stack decoder 1002 serves to control the other elements but does not perform many computations. Hence, the stack decoder 1002 preferably includes a 4341 running under the IBM VM/370 operating system as described in publications such as *Virtual Machine/System Product Introduction Release* 3 (1983). The array processors which perform considerable computation have been implemented with Floating Point System (FPS) 190L's, which are commercially available.

In the above-outlined system description, it is noted that Markov models having probability items—for which values must be assigned—are used in the fast match processor 1006 and detailed match processor 1008. The present invention involves adjusting the values of the probability items used in the acoustic matching processors to enhance word recognition accuracy.

II. Enhanced Training of Word-representing Markov Models

A. Overview

Figure 3:
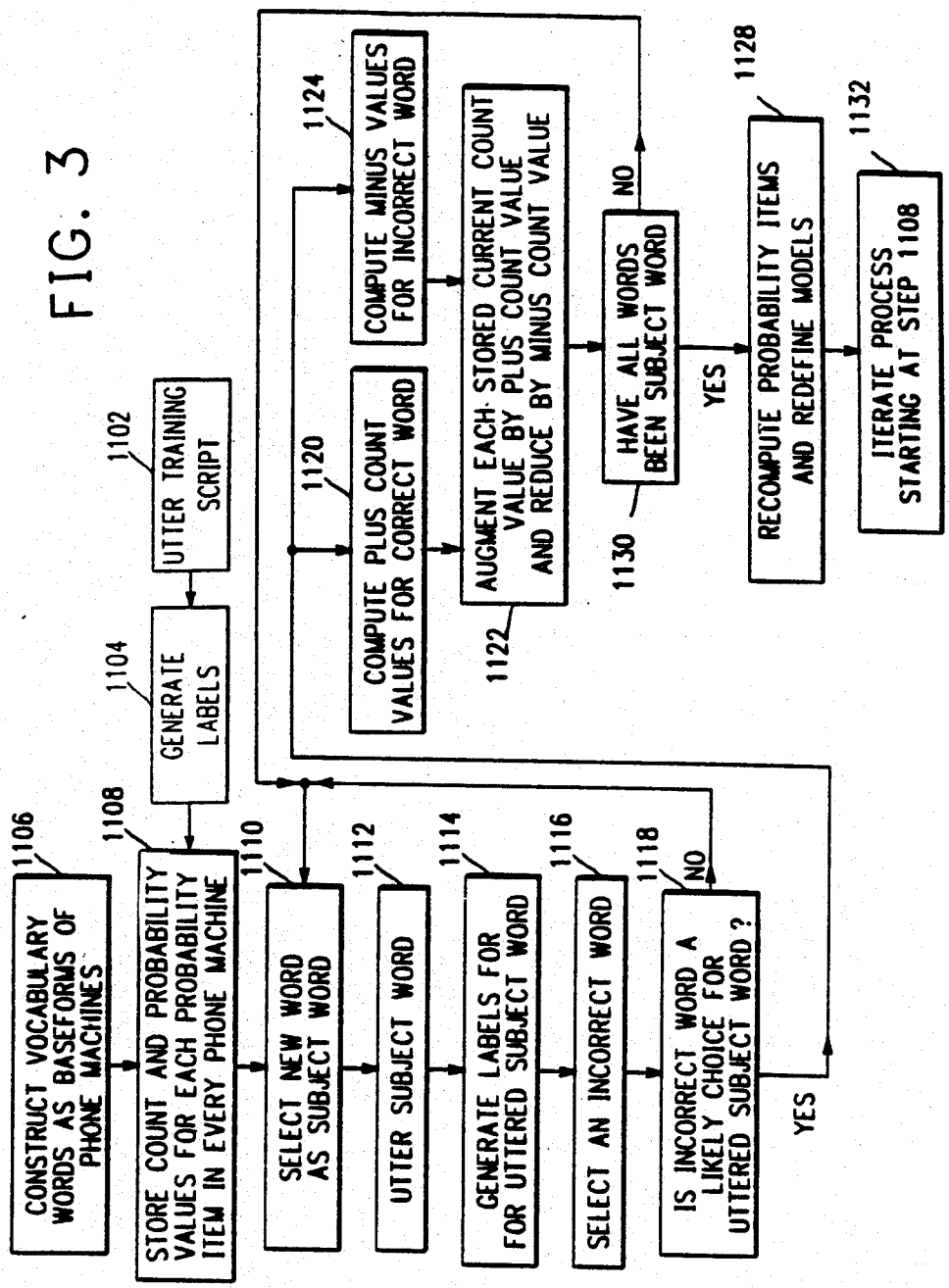
FIG. 3 is a flowchart illustrating steps performed in accordance with an embodiment of the invention.

Referring to FIG. 3, a flowchart of one general embodiment of the present invention is shown. A training script of vocabulary words is uttered in step 1102. In response to the utterance of the training script, labels are generated at step 1104. This labelling is performed by the acoustic processor 1002 identified above with reference to FIG. 1.

There are preferably 200 different labels—each identifying a sound type which can occupy an interval of time. Techniques for defining the alphabet of labels to be used are discussed in the literature. A specific technique is described in greater detail in the cited nonlinear signal processing patent application. The process broadly involves the steps of selecting features of speech, defining speech as space which is partitioned into a plurality of clusters or regions, and assigning a prototype to each region. Based on the values of predefined parameters, the distance of characteristics of the input speech from those of various prototypes is determined. The "closest" prototype is then associated with a particular time interval of speech. Each prototype is, in turn, identified by a label. Hence, for successive intervals of speech there are successive labels. Techniques for clustering, feature selection, and prototype distance measurement are known.

It is also observed in FIG. 3 that, in step 1106, each word in the vocabulary is represented as a Markov model word baseform. That is, each word is represented by a sequence of concatenated probabilistic finite state machines. (The concatenated sequence, it should be noted, is also a probabilistic finite state machine.) Each constituent machine is a "phone" machine. As noted hereinabove, phones may be characterized based on phonetics (or phonemes) or may be characterized based on labels (or fenemes). Regardless of characterization as phonetic, fenemic, or otherwise, each phone machine includes (a) a plurality of states $S_i$, (b) a plurality of transitions $tr(S_j|S_i)$, where $S_j$ may or may not be the same state as $S_i$, each transition having associated therewith a corresponding probability, and (c) for each label that can be generated at a particular transition, a corresponding actual label output probability In the phonetic case, each phone machine corresponds to a phonetic element—such as an element in the International Phonetic Alphabet. A sample phonetic-type phone machine is shown in FIG. 4.

Figure 4:
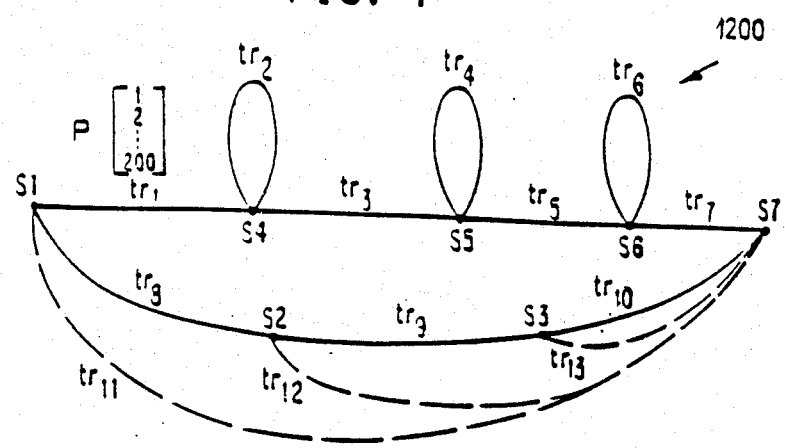
FIG. 4 is an illustration of a phonetic phone machine.

In FIG. 4, seven states $S_1$ through $S_7$ are provided and thirteen transitions tr1 through tr13 are provided in the phone machine 1200. A review of FIG. 4 shows that phone machine 1200 has three transitions with dashed line paths, namely transitions tr11, tr12, and tr13. At each of these three transitions, the phone can change from one state to another without producing a label and such a transition is, accordingly, referred to as a null transition. Along transitions tr1 through tr10 labels can be produced. Specifically, along each transition tr1 through tr10, one or more labels may have a distinct probability of being generated thereat. Preferably, for each transition, there is a probability associated with each label that can be generated by the acoustic processor. That is, if there are two hundred labels that can be selectively generated by the acoustic channel, each transition (that is not a null) has two hundred "actual label output probabilities" associated therewith—each of which having a probability value indicative of the likelihood that a corresponding label is generated by the phone at the particular transition. The actual label probabilities for transition tr1 are represented by the symbol p followed by the bracketed column of numerals 1 through 200, each numeral representing a given label. For label 1, there is a probability p[1] that the phone machine 1200 generates the label 1 at transition tr1. The various actual label probabilities are stored with relation to the label and a corresponding transition for a given phone.

If there are seventy different phones, e.g., one phone for each phonetic element, the total number of distinct probabilities—taking into account all phone machines—is the sum of label probabilities and transition probabilities. The total number of probabilities is:

```
      200  [distinct labels generatable]
    × 10   [non-null transitions per phone machine]
    × 70   [distinct phones]
   140,000 [label probabilities]
        13 [transitions per phone]
    × 70   [distinct phones]
       910 [transition probabilities]
```

There are thus a total of 140,000+910=140,910 probabilities that must be known (or estimated). A list with 140,910 entries is preferably stored in memory. As noted below, the total number of entries may differ if other types of phones are used or if transitions are merged together. In any case, each entry is for a single "probability item" which may correspond to either a label probability or a transition probability (or some probability representing merged or tied events).

The value of each probability item is derived from "counts" determined during training. Each "count" represents the probability of a respective event occurring—such as a given transition being taken from a state in a given phone machine at a given time when a particular string of label outputs are generated in response to a known input. Preferably, the count values and probability item values are determined initially according to a maximum likelihood decoding technique. That is, count statistics and probability item values are computed so as to maximize the expression $Pr(Y_{tng}|M)$ where $Y_{tng}$ is a string of labels generated during initial training and M is the Markov model. As discussed hereinbelow, different types of counts (e.g., single counts and cumulative counts) may be defined to represent correspondingly different events.

In accordance with the invention, the values for respective probability items are adjusted to improve decoding performance. Specifically, the values of the counts from which probability items are derived are biassed, or adjusted, to favor correct word decoding.

Figure 5:
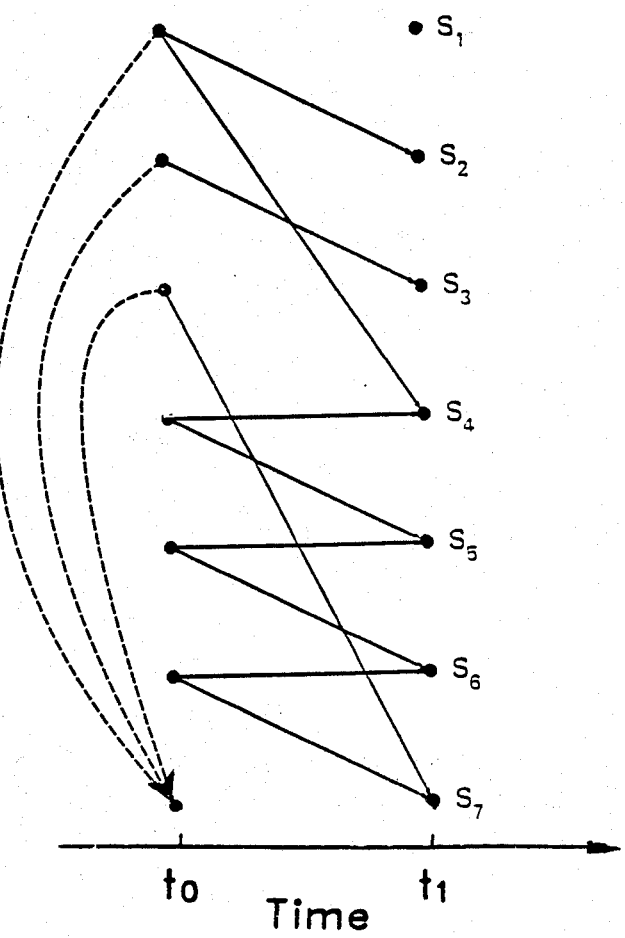
FIG. 5 is a trellis diagram for a phonetic phone machine as in FIG. 4 for one time interval.

Referring now to FIG. 5, a trellis diagram of the phone machine 1200 of FIG. 4 is shown. The trellis diagram shows a null transition from state $S_1$ to state $S_7$ and non-null transitions from state $S_1$ to state $S_2$ and from state $S_1$ to state $S_4$. The transitions between other states are also illustrated. The trellis diagram also shows time measured in the horizontal direction. A start-time probability $q_0$ can be determined to represent the probability that a phone has a start time at time $t = t_0$. At the start time $t_0$, the various transitions are shown. It should be noted, in this regard, that the interval between successive times is preferably equal in length to the time interval of a label. In FIG. 5, a single phone is shown for a single time interval.

As an alternative to phonetic phone machines, fenemic phone machines may be employed in constructing the word baseforms. The total number of probabilities when using fenemic phones (of which there are typically 200) rather phonetic-type phones (of which there are typically 70 to 100) changes. With fenemic phones, the number of phones in a word is typically greater, but the total number of transition alternatives is typically less. The present invention applies regardless of phone type. Apparatus and methodology for constructing fenemic word baseforms formed of fenemic phones is set forth in a co-pending, commonly owned patent application which is incorporated herein by reference to the extent (if any) required for adequate disclosure. The application is entitled "Feneme-based Markov Models for Words", Ser. No. 06/697174 filed Feb. 1, 1985. As with the present invention and other patent applications cited herein, this application pertains to an invention made by members of the IBM Corporation Speech Recognition group.

Figure 6:
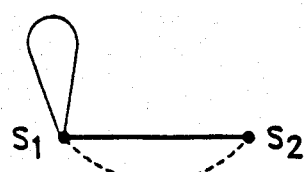
FIG. 6 is an illustration of a fenemic phone machine.
Figure 7:
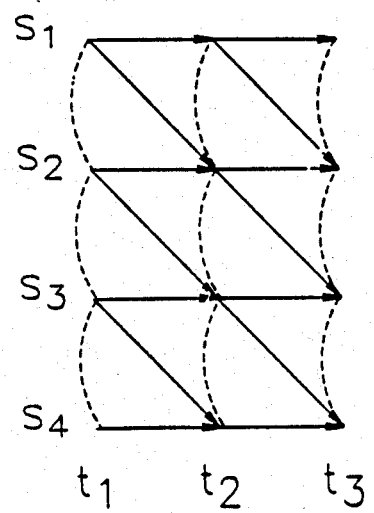
FIG. 7 is a trellis diagram of three concatenated fenemic phone machines.

Each fenemic phone has a structure such as that shown in FIG. 6. A trellis diagram for a sequence of fenemic phones is set forth in FIG. 7.

Figure 8:
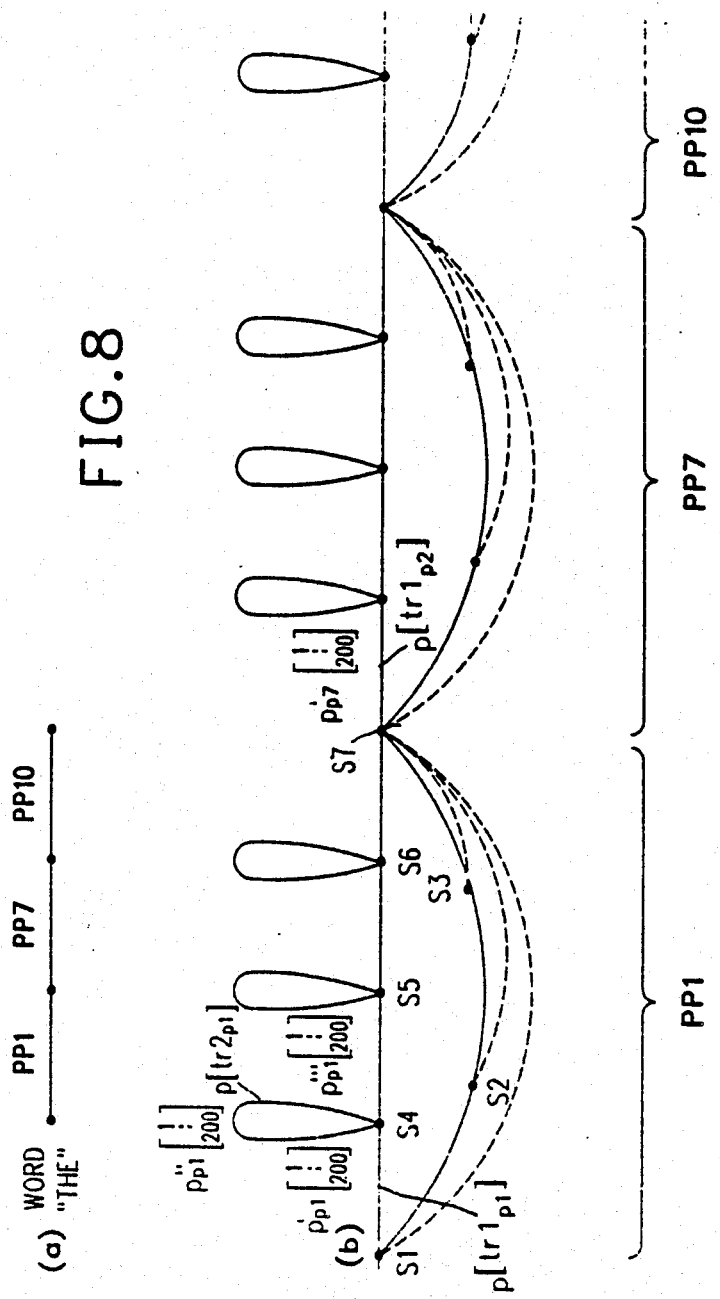
FIG. 8 is an illustration showing three phonetic phone machines in sequence, with representative probabilities being included.

In FIG. 8, a phonetic word baseform is represented. In FIG. 8(a) a sample sequence of phonetic phones corresponding to a given word is shown to be PP1 followed by PP7 and PP10. "PP", it is noted, refers to a phonetic phone. Each numeral suffix identifies a particular phone in the set of 70 (or more) phones. By way of example, the baseform of FIG. 8 is assumed to be a baseform for the word "THE". One phonetic spelling of "THE" is DH-UH1-XX. In accordance with the example, PP1 would correspond to phone DH; PP7 would correspond to phone UH1; and PP10 would correspond to phone XX. Phone PP1 has probabilities as shown in FIG. 8(b). That is, the first transition has a probability represented as $p[tr1_{P1}]$; the second transition has a probability represented as $p[tr2_{P1}]$; and so on for each transition. At transition tr1, there is also an array of label output probabilities, i.e., $p_{P1}'[1]$, $p_{P1}'[2]$, ... and $p_{P1}'[200]$. The P1 subscript identifies the phone as phonetic phone 1 of the set and the single prime (') indicates first transition. $p_{P1}[1]$ thus represents the probability of phonetic phone PP1 producing label 1 at transition 1.

To simplify the illustration of FIG. 8(b), only representative probabilities are shown. For example, for phonetic phone 7, the only transition probability shown is for the first transition, namely $p[tr1_{P7}]$. Also the label output probability array at transition tr1 is shown as $p_{P7}'$ with the 200 labels in brackets. If not simplified, the illustration would include a probability for each transition. For each non-null transition, there would also be a probability for each possible label output.

Each probability for each phonetic phone has a value therefor stored in memory. A given word (for example, "THE") can be characterized by the stored probability values associated with the phonetic phones (e.g., DH, UH1, and XX) corresponding to the given word.

Figure 9:
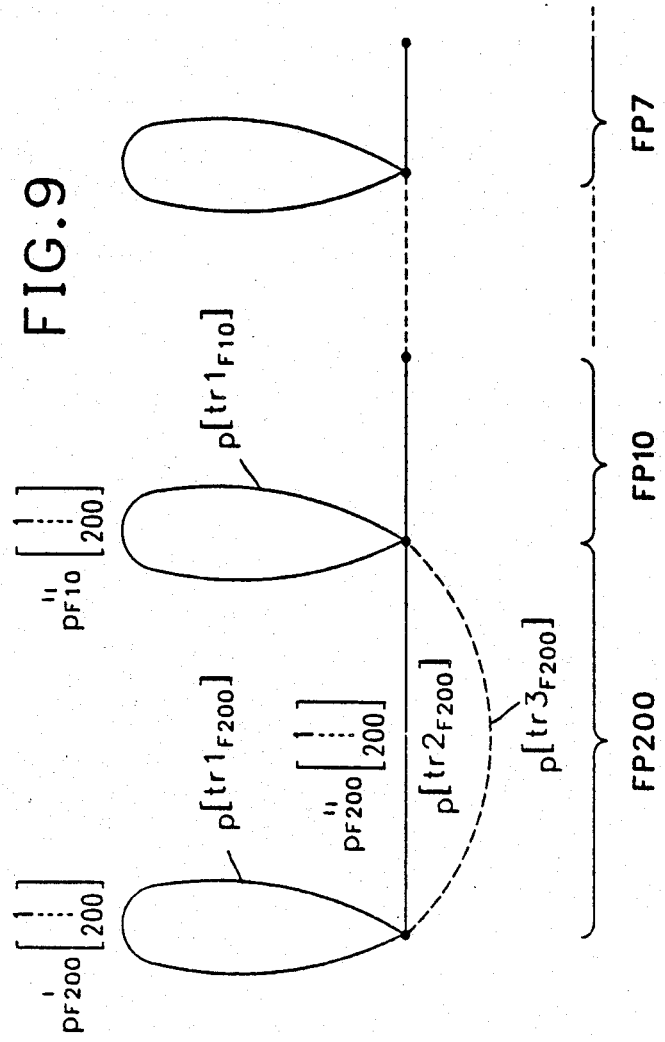
FIG. 9 is an illustration showing fenemic phone machines in sequence, with representative probabilities being included.

Referring to FIG. 9, a word is represented by a sequence of fenemic phones, each feneme corresponding to a feneme in Table 1. The word "THE" would be represented by perhaps 60 concatenated, 2-state fenemic phones rather than the three phonetic phones. The word "THE" would then be characterized by the transition and label output probabilities corresponding to the constituent fenemic phones.

For example, the first fenemic phone in the sequence would be FP200. FP200 has three transitions with respective probabilities $p[tr1_{F200}]$, $p[tr2_{F200}]$, and $p[tr3_{F200}]$. The two non-null transitions 1 and 2 of FP200 have label probabilities associated therewith.

Following fenemic phone FP200 is fenemic phone FP10 and subsequent fenemic phones, each having corresponding probabilities associated therewith. The sequence of fenemic phones, together with their associated probabilities, define a word—such as "THE".

Each phone (whether phonetic or fenemic) includes a number of transition probabilities and label output probabilities, referred to collectively as "probability items". Each probability item is allocated a portion of memory in which a corresponding value is stored. It is these values which are adjusted in accordance with the present invention in order to enhance accuracy.

The storing of values for probability items is noted in FIG. 3 at step 1108. The generating of the values initially stored is performed by any of various known training techniques. The article "Continuous Speech Recognition by Statistical Methods", for example, describes a training procedure in Section VII thereof. Specifically, the training is described in the context of the well-known forward-backward algorithm which is briefly reviewed hereinbelow. By means of the forward-backward algorithm, values for counts are derived and, from the count values, a probability value for each probability item is computed. The present invention improves these probability values and the count values from which they are derived.

As noted above, each word baseform is characterized as a sequence of phones and each phone is characterized by the probability items (and probability values therefor) associated therewith. The probability values as stored are thus readily assigned to characterize the Markov word models (or baseforms).

Considering again the word "THE" as represented by the sequence of three phonetic phones DH, UH1, and XX, each phone is represented by a phone machine such as phone machine 1200 of FIG. 4. During the training session, the three phonetic phones constituting the word "THE" are uttered and labels (or fenemes) in a string are generated in response thereto. Based on the generated labels, the forward-backward algorithm proceeds through a trellis as in FIG. 10, examining the various transitions therein. As described hereinbelow, the forward-backward algorithm is used to determine values for counts, such values being stored and adjusted according to the present invention. From this count data, improved values for the various probability items are determined and stored.

As noted hereinbelow, the stored probability item values may represent values initially computed from counts generated by the forward-backward algorithm or values previously adjusted in accordance with the invention. For uniformity, the values stored in step 1108 are, in either case, hereafter referred to as "current" stored values.

Referring again to FIG. 3, the process of enhancing the values stored during step 1108 starts with step 1110. At step 1110 a "new" word is selected from the vocabulary. The "new" word is preferably the next word in a script of spoken words. The selected word is a "subject" word, the word model for which is examined according to the following steps.

At step 1112, the subject word is uttered once. A corresponding string of labels is generated in response to the single utterance at step 1114. For the generated string of labels, a matching procedure is performed and an ordered list of candidate words is formed. One matching procedure for obtaining the order list is the fast match described hereinbelow and in the above-cited patent entitled: "Apparatus and Method of Performing Acoustic Matching".

The actual spoken word, referred to as the "correct" word, is known. In addition, from the candidate list formed during the acoustic matching, at least one "incorrect" word is selected in step 1116. If it is unlikely for an "incorrect" word to be wrongly chosen when the subject word is spoken, a decision is made at step 1118 to return to step 1110. A new subject word is then selected.

If there is a reasonable defined likelihood of the "incorrect" word being wrongly chosen when the subject word is spoken, current probability item values for the "correct" word and for the "incorrect" word are adjusted.

Specifically, one utterance of the subject word is considered. Preferably, but not necessarily, the one utterance is spoken after the initial training session. From that one utterance, a number of "plus" counts is computed for each probability item in the baseform for the correct word by applying the forward-backward algorithm to the correct word. The "plus" counts are computed in step 1120. If desired, the "plus" counts may be scaled or weighted. The "plus" count corresponds to a respective stored count and serves as an addend to the current value of the respective stored count. This augmentation is performed, in step 1122, for each stored count used in computing a probability item for the "correct" word. That is, for each of the 140,910 probability items that is included in the baseform for the correct word, the counts related thereto are recognized and the stored "current" values therefor are subject to augmentation by a corresponding "plus" count value, or by a scaled or weighted value related thereto.

In addition to augmenting "current" stored values of counts used in computing the probability items of the "correct" word, the present invention also features adjusting "current" values of counts used in computing the probability items that are included in the baseform for the "incorrect" word. In this regard, the subject ("correct") word is uttered but the word model for the "incorrect" word is considered. The counts associated with the baseform for the "incorrect" word have stored "current" values associated therewith. Based on a single utterance of the subject word, "minus" count values are computed for the baseform for the "incorrect" word in step 1124. Each "minus" count value, or a scaled or weighted value related thereto, then serves as a negative bias value.

For a given count associated with the correct word, then there is a "plus count value", (or related value thereof) which is added to the stored value of the given count. Similarly, for a given count associated with an incorrect word, there is a "minus count value" (or related value) which is subtracted from the stored value of the given count. For a given count associated with the correct word and incorrect word, the given count is subject to augmentation by a "plus count value" (or related value), and a diminution by a "minus count value" (or related value). This results in an adjusted value for each given count. The probability items are later recomputed from the adjusted counts at step 1128 and are biassed accordingly toward the "correct" word and away from the "incorrect" word.

Figure 10:
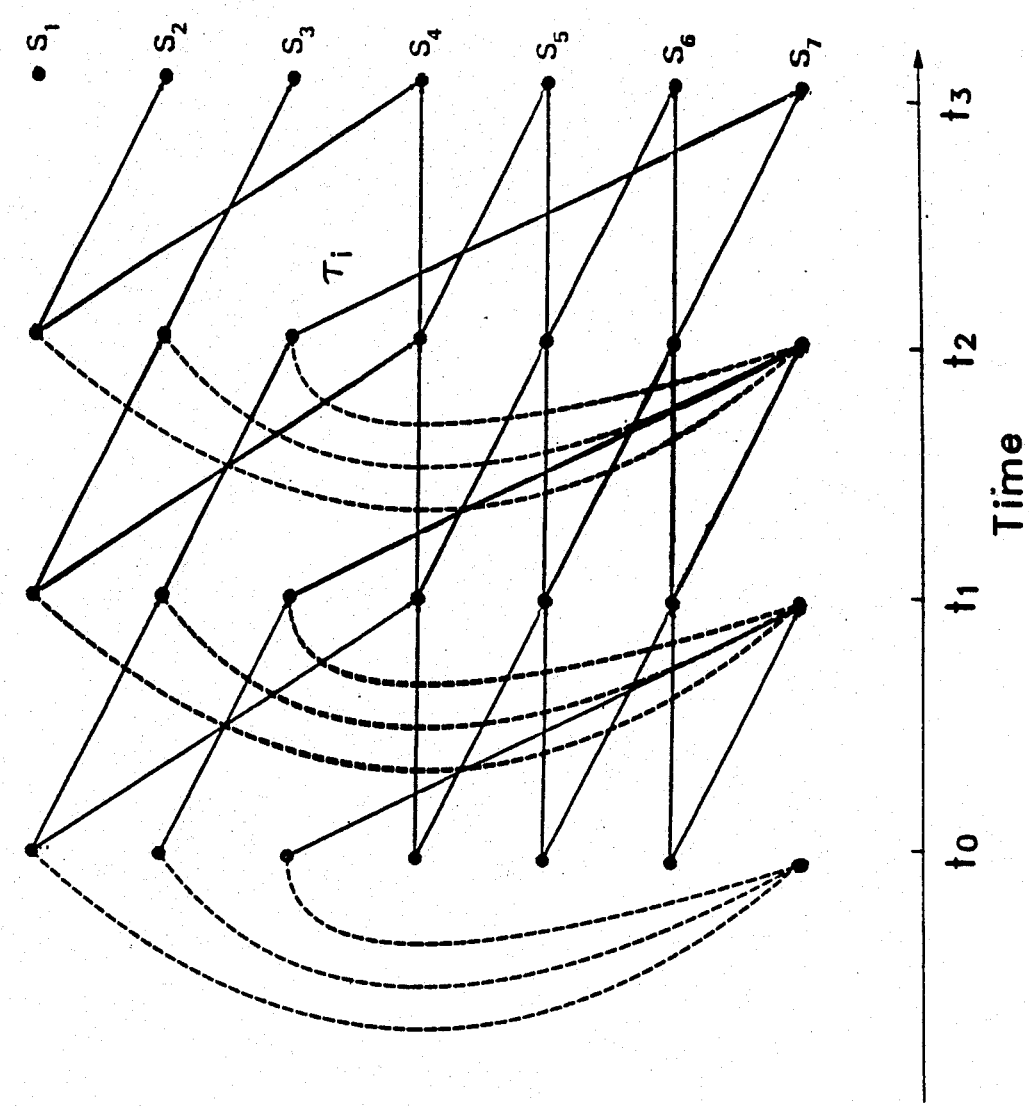
FIG. 10 is an illustration of a trellis, or lattice, of a phonetic phone machine over three time intervals.

Reference is again made to FIG. 10. FIG. 10 represents a portion of a trellis based on phone machines as set forth in FIG. 4. In particular, three successive phone model representations are set forth at successive label time intervals. The three phone model representations define a large number of tracks which may represent the utterance of a particular phone or phones. For example, for a given phone, one possible track may start at time $t_0$ at state $S_1$ and then proceed from state $S_1$ to state $S_2$. From state $S_2$ at time $t_1$ the track may continue to state $S_3$ at time $t_2$ and thereafter to state $S_7$ (the final state). The phone would then extend three time intervals. A given phone may be shorter in length or may extend over more time intervals. The trellis represents a framework in which an utterance may be tracked. The forward-backward algorithm (as described hereinbelow) outlines the steps of determining the various probabilities associated with transitions in the trellis and label probabilities at the transitions.

Suppose that the trellis of FIG. 10 corresponds to the phone DH as in the word "THE". By way of explanation, one probability item is considered. The probability item relates to the likelihood of producing a label $f_h$ at transition $\tau_i$. In this example, $f_h$ corresponds to label TH1, a label in the alphabet of labels. (See Table 1.) During initial training, a preliminary value for the probability item corresponding to the label TH1 being produced at transition $\tau_i$ is stored. The preliminary value for the TH1 probability item is computed from stored count values, based on preferably a number of utterances of the phone DH. Suppose that the preliminary value derived during training for the probability item relating to the label TH1 being produced at $\tau_i$ is 0.07. Also suppose that the occurrence of the label TH1 at a particular transition $\tau_i$ in the DH phone machine is identified as probability item 9001 in the list of 140,910 probability items. Probability item 9001 thus has a stored current probability value of 0.07. Preliminary values are similarly stored for each other probability item. Moreover, there is also a preliminary value stored for each count that is used in the computation of the probability item probabilities. Suppose that one of the counts COUNTX used in computing probability item 9001 has a preliminary value of 6. COUNTX is, as discussed hereinbelow, a "cumulative count."

With values stored for all counts and probability items, the present invention proceeds. For purposes of explanation, it is supposed that for the "correct" word "THE", the acoustic fast match for the given vocabulary indicates that "THEN" is a candidate word. The detailed match thereafter indicates that the word "THEN" is the "incorrect" word most likely to be wrongly chosen (step 1116 of FIG. 3) based on a single utterance of the word known "THE" (step 1114). The match score for the word "THEN" is then found—according to the acoustic matching—to be within some predefined limit of the match score for the word "THE".

A "plus" count value (if any) for each count in the baseform for the correct word is then computed by applying the forward-backward algorithm, based on the single utterance. Continuing the above example, suppose that COUNTX which is used in computing the value for probability item 9001—i.e., TH1 being generated at transition $\tau_j$ in the DH phone—has a "plus count value" of 1.5 generated in response to the single utterance of the correct word "THE". The "plus" count value, namely 1.5, is preferably, but not necessarily, scaled by some factor, e.g., $\frac{1}{2}$. (One method in which the factor may be determined is discussed hereinbelow.) The scaled value 0.75 is added to the previously stored value 6 for count COUNTX. The value of COUNTX is now adjusted to be 6.75.

The "minus" count value (if any) for "COUNTX" corresponding to the "incorrect" word "THEN" is also determined by applying the forward-backward algorithm. It is supposed that the "minus count value" is 0.04. The "minus count value" is then preferably, but not necessarily, also scaled—e.g., by $\frac{1}{2}$. The "minus" count value then has a value of 0.02. The "minus count value" serves as a subtrahend applied to the value of COUNTX. COUNTX is thus adjusted to a value of $6 + 0.75 - 0.02 = 6.73$.

If a count is in both the correct word baseform and in the incorrect word baseform, the current stored value associated therewith is augmented by the "plus" count value, the sum being reduced by the "minus" count value. The order of addition and subtraction is unimportant. Moreover, if a count is used in either only the correct word baseform or incorrect word baseform, the respective "plus count value" is added or "minus count value" is subtracted for the current value stored for the respective count. As the value stored for a count is adjusted, the adjusted value is entered into memory for subsequent use. Specifically, each adjusted value serves as the current stored value in any subsequent adjustment of the count. As noted below, one word after another may be uttered resulting in count values being successively adjusted as appropriate.

With reference in FIG. 3, a decision is made in step 1130 as to whether all words to be uttered have been the subject word. If not, a new word is selected and the process starting at step 1110 is repeated for the new word. When all of the words to be uttered have been the subject word—thereby ending an iteration—the present invention provides that probability values be recomputed (step 1128) from the adjusted counts based on their values at the end of the iteration. The current stored probability values of the probability items are then used in determining acoustic match scores and count values in the next iteration. For the next iteration, the entire process is repeated (see step 1132) with redefined word models as the starting point in step 1108.

In accordance with the invention, the augmentation and reduction of count values for a given probability item may occur a number of times as successive words are uttered during a given iteration and with successive iterations. Moreover, the same count, if used in computing several probability items in a given word, may be adjusted several times in one iteration.

Figure 11:
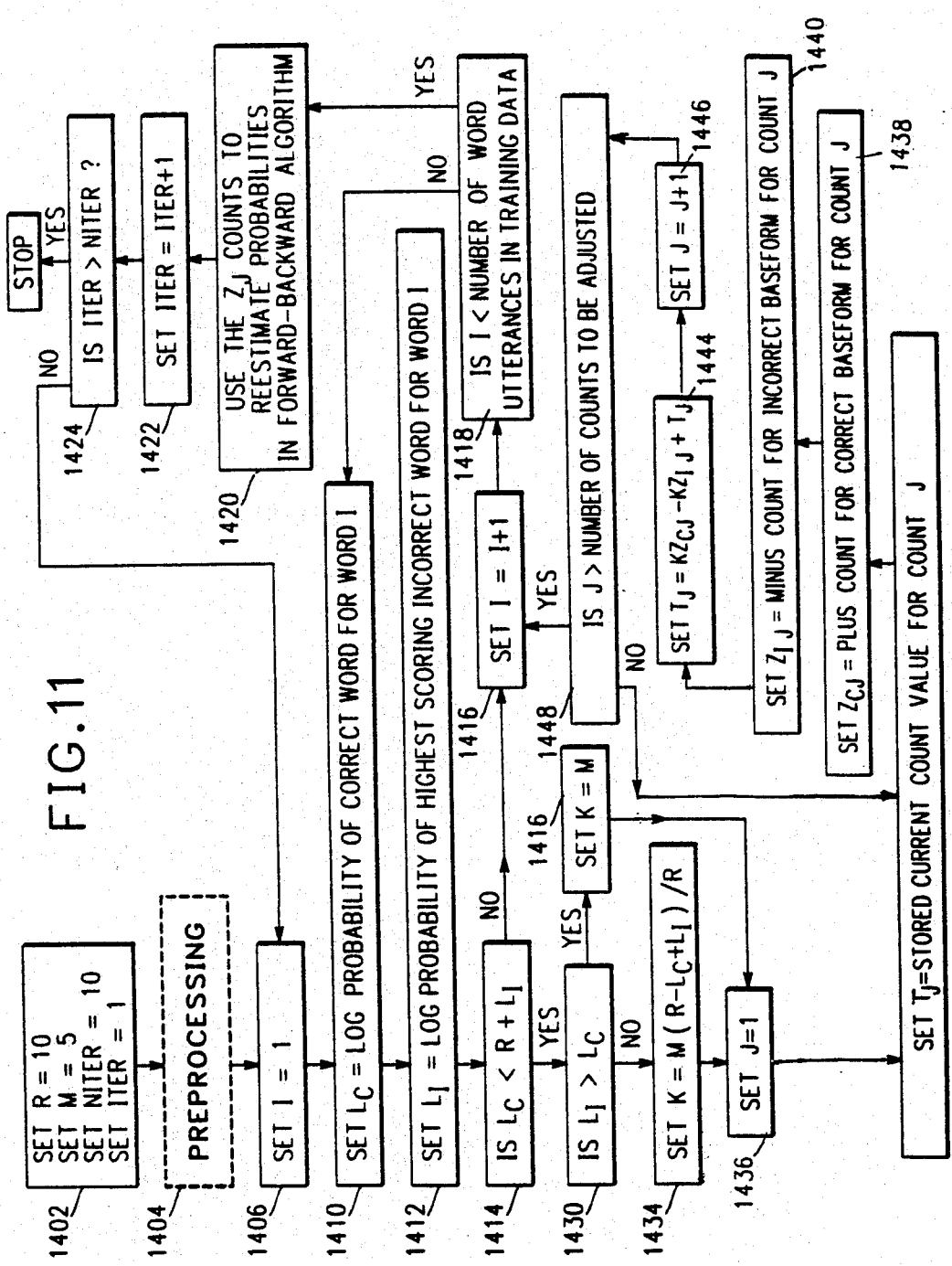
FIG. 11 is a flowchart diagram showing steps followed in an embodiment of the invention.

Referring next to FIG. 11, a flowchart of a specific embodiment of the invention is set forth. In the FIG. 11 embodiment, each count has a stored "current" value. The stored "current" value of each count is adjusted by a "plus" count value and a "minus" count value as appropriate. One definition of the term "count" value is suggested hereinbelow, it being recognized that other definitions may also be employed in practicing the invention.

The embodiment of FIG. 11 starts with step 1402. In step 1402, a number of variables are introduced and set. The variables are defined hereinbelow as they arise in the flowchart. The variables can be varied if desired.

In step 1404, an auxiliary preprocessing step is provided. In the preprocessing step every transition probability distribution is "smoothed" by replacing the highest probability by the second highest and thereafter renormalizing the distribution. During the preprocessing step, the following start up events are performed: (1) Set n=1; (2) Set X=second largest label output probability in the nth output distribution; (3) Set the largest output probability in the nth output distribution=X; (4) Renormalize nth output distribution; (5) Set n=n+1; and (6) Decide if n>number of output distributions. If not, the preprocessing loops back to step (2). If yes, preprocessing ends and step 1406 follows. The preprocessing step is not a critical step of the invention, but is disclosed by way of background.

In step 1406, a variable I—representing the number of the uttered word—is initialized at 1. In step 1410, a logarithmic probability—namely $L_C$—for the "correct" word baseform for the Ith word is set. The Ith word is the known (or subject) word that is uttered. The value of the log probability $L_C$ is determined during acoustic matching.

In step 1412, the "incorrect" word having the highest likelihood of having produced the labels generated in response to the single utterance of the Ith word is noted and its logarithmic probability set as $L_I$. In step 1414, the two log probabilities are compared to determine if $L_C$ exceeds $L_I$ by a value R. R is a non-negative threshold typically set at approximately ten. If $L_C$ does exceed $L_I$ by the factor R, I is incremented in step 1416 to summon a new word. If all words have not been summoned, the process jumps back to step 1410 with the new word. If all words to be uttered have been summoned, the whole process is repeated starting with previously adjusted values of the counts (steps 1418 and 1420) serving as the stored "current" values of the counts. The process iterates until the variable ITER is indexed in step 1422 to exceed a value set for NITER (step 1424).

If $L_C$ does not exceed $L_I$ by more than R, a determination is made as to whether $L_I$ exceeds $L_C$ (step 1430). This may occur when the acoustic match lists the "incorrect" word with a higher match value than the "correct" word. In the event that $L_I$ exceeds $L_C$, the variable K is set equal to the value M in step 1432. M is a non-negative threshold supplied as a parameter to the program. Typically, M would lie in the range between one and ten. Higher values lead to more rapid convergence, however result in cruder adjustment.

If $L_I$ is not greater than $L_C$ and differs from $L_C$ by less than R, K is set equal to $M(R-L_C+L_I)/R$ in step 1434. After step 1432 or 1434, the variable J is set to 1. The variable J is a count identifier. The variable $T_J$ is set equal to the current stored value for an identified Jth count. During the first adjustment of the first iteration, the stored value is the first value entered for the identified count. The stored value for a given count may represent a value for the given count, which was previously adjusted as the result of one or more prior iterations (step 1436).

A variable $Z_{CJ}$ is determined in step 1440. The variable $Z_{CJ}$ represents a "plus" count value that indicates the number of times the event corresponding to the Jth count occurs based on the correct word baseform, given a single utterance of the word corresponding to the correct baseform. That is, for the labels generated in response to the utterance of the known word, the "correct" word baseform is subjected to the forward-backward algorithm to determine value of the "plus" count for each Jth count. This is performed in step 1438 for each count used in computing probability items in the "correct" word baseform.

A variable $Z_{IJ}$ represents a "minus" count value that indicates the number of times the event corresponding to the Jth count occurs based on the incorrect word baseform, given a single utterance of the word corresponding to the correct baseform. That is, for the labels generated in response to the utterance of the known word, an incorrect word baseform is subjected to the forward-backward algorithm to determine the value of the "minus" count for each Jth count.

A stored value for each Jth count is adjusted by scaling the "plus" count value, $Z_{CJ}$, by K and by scaling the "minus" count value by K and making the computation (step 1444):

$$T_J(\text{adjusted}) = KZ_{CJ} - KZ_{IJ} + T_J$$

The "plus" count value and "minus" count value are each shown to be scaled by the same factor K. Under these conditions, the occurrence of a correct count event evenly balances the occurrence of an incorrect count event. Although this is preferable, the present invention contemplates weighing the "plus" count values differently than the "minus" count values.

In addition, each adjusted count has a minimum threshold to assure that no previously non-zero count is reduced to zero or a negative value. This minimum level may, by way of example, be on the order of 0.1.

After the count $T_J$ is adjusted, the variable J is incremented in step 1446. The incremented value for J is compared with a number indicating the number of counts that are to be subject to adjustment (step 1448). In this regard it is observed that the number of counts subject to adjustment is preferably equal to only those counts used in computing probability items that are in the correct word baseform or in the incorrect word baseform or both. Alternatively, each count for the 140,910 probability items may be subject to adjustment for each utterance. In this latter instance, many of the counts will have zero adjustment.

If all counts subject to adjustment have not been updated, as determined in step 1448, a previously unexamined count is selected and a "plus count value" (if any) and a "minus count value" (if any) are determined and the stored count therefor adjusted as outlined hereinabove.

After all appropriate counts have been subjected to adjustment, I is incremented in step 1416. Step 1418 and steps thereafter follow as described hereinabove. Specifically, with adjusted values for the counts, the probability item values are recomputed at the end of an iteration. The recomputed values for the probability items are then stored and applied as appropriate to the Markov models used in acoustic matching. For example, the adjusted values for the probability items shown in FIG. 8(b) replace any prior values therefor and are used in fast acoustic matching and detailed matching. It should be recognized that with each incrementation of I a different word utterance is examined. If desired, however, the same word may be uttered more than once at different values of I.

B. Defining Transition Probabilities and Label Output Probabilities Based on Counts Transition probabilities and label output probabilities are defined in terms of "counts". A "count" typically defines the (expected) number of times a particular event occurs. In the present context, there are "single counts" and "cumulative counts." Unless otherwise specified, the term "count" when used alone means "single count".

Given estimated $\theta'$ for the probability items, and a string of labels generated during training, a "single count" is defined herein as the probability of a particular transition $\tau_i$ and state $S_j$ given (a) a certain string Y of labels, (b) defined estimated values $\theta'$, and (c) a particular time t. Each above-described single count is determined by applying the well-known forward-backward algorithm, or Baum-Welch algorithm.

According to the above definition, the single count may be represented by the expression:

$$\Pr(S_j, \tau_i | Y, \theta', t)$$

In computing the single counts set forth above, the $\theta'$ may be omitted as implicit in the characterization Pr′. Applying Bayes Theorem, the expression becomes:

$$\Pr'(\tau_i, S_j, Y | t)/\Pr'(Y)$$

Pr′(Y) is identified as the probability derived from the forward pass probability computed using the parameters $\theta'$. The problem is thus reduced to computing the probabilities:

$$\Pr'(\tau_i, S_j, Y | t) \text{ for all, i, t.}$$

which—for each i,t—represents the probability that the Markov model produced the label string Y and that transition $\tau_i$ was taken at time t.

By summing the single counts for a specific $S_j$, $\tau_i$, Y, and $\theta'$ for each time t, a transition "cumulative count" is determined for a corresponding transition probability item. Because the transition cumulative count is a sum of probabilities, its value may exceed unity. For each transition probability item, a respective cumulative count is stored. By dividing this cumulative count for a given transition by the sum of cumulative counts for all transitions which can be taken from the same initial state as that for $\tau_i$, a current probability value for the respective transition probability item is computed. The current probability value is preferably stored and associated with its respective transition probability item.

Each transition probability item, it is noted, is preferably defined in estimated form as:

$$Pr\left(\tau_i | S_j\right) = \left[\sum_{t=1}^{T+1} Pr'(S_j, \tau_i | Y, t)\right]$$

divided by $$\sum_{k=1}^{K} \sum_{t=1}^{T+1} Pr'(S_j, \tau_k | Y, t)$$

From the above equation, it is evident that each transition probability is defined in terms of counts. The numerator is a cumulative count—the sum of single count values for a given transition $\tau_i$ at any time through time $T+1$—while the denominator represents the sum of single count values taken over all possible transitions $\tau_1$ through $\tau_K$ which have the same initial state as $\tau_i$ taken over all times through time $T+1$.

Furthermore, it is noted that each label output probability at any non-null transition is preferably also defined in terms of counts. That is, an estimated label output probability $Pr'$ for a label $f_h$ being produced given a transition $\tau_i$ and state $S_j$ is mathematically represented as:

$$Pr(f_h/|\tau_i, S_j) = \Sigma_{t:y_t = f_h} Pr'(S_j, \tau_i | Y, t)$$

divided by $$\Sigma_{t=1}^{T} Pr'(S_j, \tau_i | Y, t)$$

where $f_h$ corresponds to a specific label selected from the alphabet of labels and $y_t$ corresponds to the label generated at a time interval t.

Each summed term in the numerator represents the probability that a label $y_t$ generated in the string Y is label $f_h$ and that the label $y_t$ was produced on transition $\tau_i$ out of state $S_j$, given that the generated label output was the string Y.

The sum in the numerator is a label "output cumulative count" and is preferably stored with the associated label output probability item corresponding therewith. By dividing this cumulative count by the sum of single counts over all label times for the specific $S_j$, $\tau_i$, Y, and $\theta'$, a current probability value is determined for the respective label output probability item.

The transition probabilities and label output probabilities are accordingly readily computed from the counts after an iteration of count adjustment.

In FIG. 12, a table is shown from which updated, or adjusted, values for probability items can be computed based on counts. In the fourth column thereof is a list of which single counts have values that are summed to form the cumulative count associated with the probability item. The fifth column identifies the single counts having values that are summed to form the denominator by which the cumulative count is divided to yield the value of the probability item. The single count values, computed by the forward-backward algorithm, are shown in the table of FIG. 13. The entering and storing of the information set forth in FIGS. 12 and 13 is readily performed by known techniques.

C. Determining Values for Counts

In determining the values for the counts, the well-known forward-backward algorithm is used. For all values of i, j, and t, that is, the value of $Pr'(S_j, \tau_i | Y, t)$ is determined and stored as a value of a respective count.

A detailed description of the forward-backward algorithm is set forth in Appendix III of the above-cited article entitled "Continuous Speech Recognition by Statistical Methods".

Figure 14:
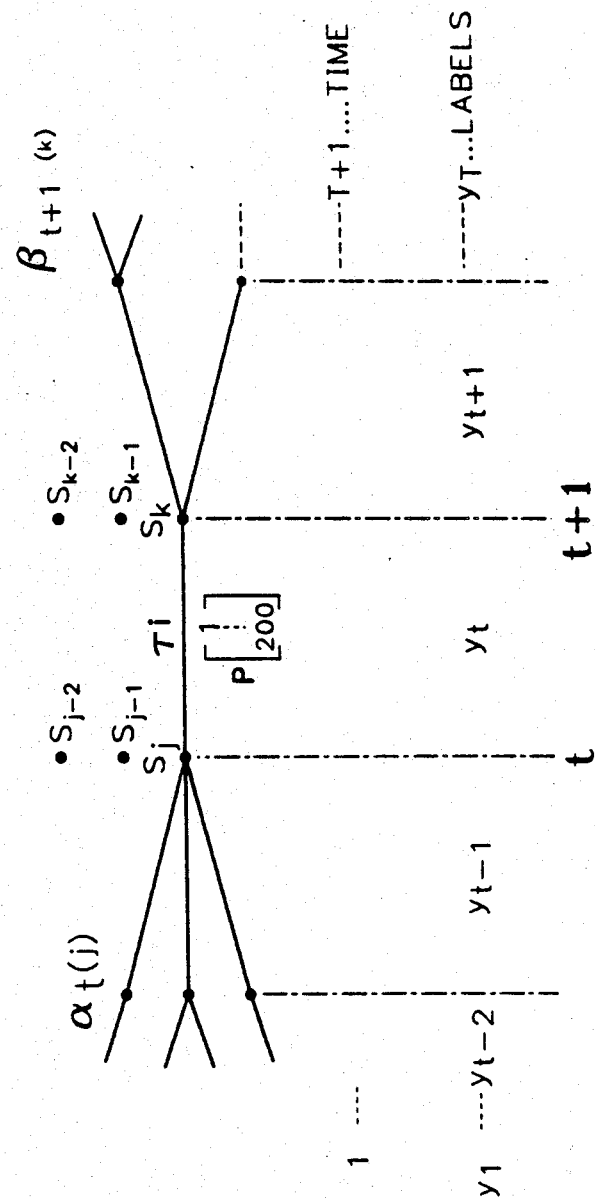
FIG. 14 is an illustration showing a transition $\tau_i$ in a trellis diagram.

The basic concept of the forward-backward algorithm is now discussed with reference to FIG. 14 for a non-null transition. In FIG. 14, time is measured horizontally. Each time interval corresponds to the time interval during which a label can be generated. Labels $y_1$ through $y_T$ are shown as having been generated between time intervals 1 through $T+1$. In the vertical direction are successive states. In the trellis diagram of FIG. 12, time, states, transitions, and the generation of labels are shown.

The probability $Pr'(S_j, \tau_i, |Y, t)$ it is observed can be represented as three components of a product. First, there is the probability of being at state $S_j$ (at time t) coupled with the probability of producing labels $y_1$ through $y_{t-1}$. This component is denoted $\alpha_t(j)$. The second component of the product is the probability of taking transition $\tau_i$ from state $S_j$ and producing label $y_t$. This may be expressed as:

$$Pr(\tau_i | S_j) Pr(y_t | S_j, \tau_i)$$

This second component is based on the previously defined current value stored for the transition probability item (at transition $\tau_i$) or for the label output probability item (for label $f_h$).

The third component of the product is denoted as $\beta_{t+1}(k)$. This third component represents the probability of producing labels $y_{t+1}$ through $y_t$ starting at state $S_k$ (at time t+1).

When $\tau_i$ represents a null transition, the components become simplified because there is no requirement that a particular label be produced during the examined transition.

The $\alpha$ probability is referred to as the forward pass probability, which is also identified as $Pr(S, t)$. Successive $\alpha$'s are determined recursively starting at time 1 according to the expressions:

$$\alpha_1(1) = 1.0$$

$$\alpha_t(S) = \Sigma_{\sigma \epsilon m(S)} \alpha_{t-1}(\sigma) Pr(y_t, \sigma \rightarrow S) - \text{if}$$
$$t > 1 - + \Sigma_{\sigma \epsilon n(S)} \alpha_t(\sigma) Pr(\sigma \rightarrow S)$$

where n(S) represents the set of states possessing a null transition to state S and m(S) represents the set of states having a non-null transition to state S. In accordance with the forward pass, for times 1, 2, . . . , T+1 in sequence, the value of $\alpha_t(S)$ is computed for S=1, 2, . . . , $S_F$ in sequence where $S_F$ is the final Markov model state. This is performed by solving the expression for $\alpha$ recursively. Calculation proceeds forward in time and forward through the states.

The backward pass involves determining the probability $\beta_t(S)$, the probability of completing the output string of labels starting from state S at time t. The $\beta$'s satisfy a similar computation as do the $\alpha$'s. The main difference is that the forward pass starts at state 1 and moves forward in time therefrom whereas the backward pass starts at the final state ($S_F$) and proceeds backward in time, and backwards through the states.

With N(S) representing the set of states which can be reached from S through a null transition, and M(S)

representing the set of states which can be reached from S through a non-null transition, the following expressions apply:

$$\beta_{T+1}(S_F) = 1.0$$

$$\beta_t = \Sigma_{\sigma \epsilon M(S)} Pr(y_t, S \rightarrow \sigma)\beta_{t+1}(\sigma) \text{—if } t \leq T - + \Sigma_{\sigma \epsilon N(S)} Pr(S \rightarrow \sigma)\beta_t(\sigma)$$

In the backward pass, then, for time=T+1, T, ..., 1—in sequence—values of $\beta_t(S)$ are computed for $S = S_F, S_{F-1}, \ldots, 1$ in sequence using the above recursive expressions.

With the three components determined for each given i, j, and t, the count values corresponding thereto are readily computed.

The forward-backward algorithm, it is noted, is employed first in determining initial or current stored count values and thereafter for plus count values and minus count values.

D. The Baum-Welch Algorithm

In accordance with the Baum-Welch algorithm, "maximum likelihood" probabilities are sought. Specifically, the following procedure is employed to assure that the term $Pr(Y|M)$ approaches a local maximum.

First, initial values are chosen for the probability values for the transition probability items and for the label output probability items.

Next, the forward-backward algorithm is used to compute the stored count values as outlined hereinabove.

Given the computed counts, the probability values for the transition probability items and the label output probability items are re-computed.

The forward-backward algorithm and the subsequent recomputation of the transition and label output probabilities are repeated until convergence is achieved. At that point, maximization is achieved based on the Baum-Welch algorithm.

It is the values for the probability items resulting after maximization is achieved that preferably serve as the starting point for adjustment of values according to the present invention.

The Baum-Welch algorithm is described in an article entitled: "A Maximization Technique Occurring in the Statistical Analysis of Probabilistic Functions of Markov Chains", by L. E. Baum et al., *Annals of Mathematics and Statistics*, volume 41, 164-171, 1970.

E. Detailed Match

In employing the phone machine 1200 to determine how closely a given phone matches the labels of an incoming string, an end-time distribution for the phone is sought and used in determining a match value for the phone. The notion of relying on the end-time distribution is common to all embodiments of phone machines discussed herein relative to a matching procedure. In generating the end-time distribution to perform a detailed match, the phone machine 1200 involves computations which are exact and complicated.

Looking at the trellis diagram of FIG. 10, we first consider the computations required to have both a start time and end time at time $t = t_0$. For this to be the case according to the example phone machine structure set forth in FIG. 4, the following probability applies:

$$Pr(S_7, t=t_0) = q_0 T(1 \rightarrow 7) + Pr(S_2|t=t_0)T(2 \rightarrow 7) + Pr(S_3|t=t_0)T(3 \rightarrow 7)$$

where Pr represents "probability of" and T represents the transition probability between the two parenthetically identified states and $g_0$ is a start-time distribution at time $t = t_0$. The above equation indicates the respective probabilities for the three conditions under which the end time can occur at time $t = t_0$. Moreover, it is observed that the end time at $t = t_0$ is limited in the current example to occurrence at state $S_7$.

Looking next at the end time $t = t_1$, it is noted that a calculation relating to every state other than state $S_1$ must be made. The state $S_1$ starts at the end time of the previous phone. For purposes of explanation, only the calculations pertaining to state $S_4$ are set forth.

For state $S_4$, the calculation is:

$$Pr(S_4|t=1) = Pr(S_1|t=t_0)T(1 \rightarrow 4)Pr(y|1 \rightarrow 4) + Pr(S_4|t=t_0)T(4 \rightarrow 4)Pr(y|4 \rightarrow 4)$$

In words, the equation set forth immediately above indicates that the probability of the phone machine being in state $S_4$ at time $t = t_1$ is dependent on the sum of the following two terms (a) the probability of being at state $S_1$ at time $t = t_0$ multiplied by the probability (T) of the transition from state $S_1$ to state $S_4$ multiplied further by the probability (Pr) of a given label—y—in the string being generated given a transition from state $S_1$ to state $S_4$ and (b) the probability of being at state $S_4$ at time $t = t_0$ multiplied by the probability of the transition from state $S_4$ to itself and further multiplied by the probability of generating the given label—y—during and given the transition from state $S_4$ to itself.

Similarly, calculations pertaining to the other states (excluding state $S_1$) are also performed to generate corresponding probabilities that the phone is at a particular state at time $t = t_1$. Generally, in determining the probability of being at a subject state at a given time, the detailed match (a) recognizes each previous state that has a transition which leads to the subject state and the respective probability of each such previous state; (b) recognizes, for each such previous state, a value representing the probability of the label that must be generated at the transition between each such previous state and the current state in order to conform to the label string; and (c) combines the probability of each previous state and the respective value representing the label probability to provide a subject state probability over a corresponding transition. The overall probability of being at the subject state is determined from the subject state probabilities over all transitions leading thereto. The calculation for state $S_7$, it is noted, includes terms relating to the three null transitions which permit the phone to start and end at time $t = t_1$ with the phone ending in state $S_7$.

As with the probability determinations relative to times $t = t_0$ and $t = t_1$, probability determinations for a series of other end times are preferably generated to form an end-time distribution. The value of the end-time distribution for a given phone provides an indication of how well the given phone matches the incoming labels.

In determining how well a word matches a string of incoming labels, the phones which represent the word are processed in sequence. Each phone generates an end-time distribution of probability values. A match value for the phone is obtained by summing up the end-time probabilities and then taking the logarithm of that sum. A start-time distribution for the next phone is derived by normalizing the end-time distribution by, for example, scaling each value thereof by dividing each value by the sum so that the sum of scaled values totals one.

It should be realized that there are at least two methods of determining h, the number of phones to be examined for a given word or word string. In a depth first method, computation is made along a baseform—computing a running subtotal with each successive phone. When the subtotal is found to be below a predefined threshold for a given phone position therealong, the computation terminates. Alternatively, in a breadth first method, a computation for similar phone positions in each word is made. The computations following the first phone in each word, the second phone in each word, and so on are made. In the breadth first method, the computations along the same number of phones for the various words are compared at the same relative phone positions therealong. In either method, the word(s) having the largest sum of match values is the sought object.

The detailed match has been implemented in APAL (Array Processor Assembly Language) which is the native assembler for the Floating Point Systems, Inc. 190L. In this regard, it should be recognized that the detailed match requires considerable memory for storing each of the actual label probabilities (i.e., the probability that a given phone generates a given label y at a given transition); the transition probabilities for each phone machine; and the probabilities of a given phone being at a given state at a given time after a defined start time. The above-noted FPS 190L is set up to make the various computations of end times, match values based on, for example, a sum—preferably the logarithmic sum of end time probabilities; start times based on the previously generated end time probabilities; and word match scores based on the match values for sequential phones in a word. In addition, the detailed match preferably accounts for "tail probabilities" in the matching procedure. A tail probability measures the likelihood of successive labels without regard to words. In a simple embodiment, a given tail probability corresponds to the likelihood of a label following another label. This likelihood is readily determined from strings of labels generated by, for example, some sample speech.

Hence, the detailed match provides sufficient storage to contain baseforms, statistics for the Markov models, and tail probabilities. For a 5000 word vocabulary where each word comprises approximately ten phones, the baseforms have a memory requirement of 5000×10. Where there are 70 distinct phones (with a Markov model for each phone) and 200 distinct labels and ten transitions at which any label has a probability of being produced, ths statistics would require 70×10×200 locations. However, it is preferred that the phone machines are divided into three portions—a start portion, a middle portion, and an end portion—with statistics corresponding thereto. (The three self-loops are preferably included in successive portions.) Accordingly, the storage requirements are reduced to 70×3×200. With regard to the tail probabilities, 200×200 storage locations are needed. In this arrangement, 50K integer and 82K floating point storage performs satisfactorily. Moreover, it should be noted that earlier generations of the system have included 70 different phones, but the present invention may alternatively provide for on the order of 96 phones with respective phone machines.

F. Approximate Fast Match

Because the detailed match is computationally expensive, a basic fast match and an alternative fast match which reduce the computation requirements without sacrificing accuracy are provided. The fast match is preferably used in conjunction with the detailed match, the fast match listing likely candidate words from the vocabulary and the detailed match being performed on, at most, the candidate words on the fast match list.

A fast approximate acoustic matching technique is the subject of the co-pending patent application entitled "Apparatus and Method of Performing Acoustic Matching". In the fast approximate acoustic match, preferably each phone machine is simplified by replacing the actual label probability for each label at all transitions in a given phone machine with a specific replacement value. The specific replacement value is preferably selected so that the match value for a given phone when the replacement values are used is an overestimation of the match value achieved by the detailed match when the replacement values do not replace the actual label probabilities. One way of assuring this condition is by selecting each replacement value so that no probability corresponding to a given label in a given phone machine is greater than the replacement value thereof. By substituting the actual label probabilities in a phone machine with corresponding replacement values, the number of required computations in determining a match score for a word is reduced greatly. Moreover, since the replacement value is preferably an overestimation, the resulting match score is not less than would have previously been determined without the replacement.

In a specific embodiment of performing an acoustic match in a linguistic decoder with Markov models, each phone machine therein is characterized—by training—to have (a) a plurality of states and transition paths between states, (b) transitions $tr(S_j|S_i)$ having probabilities $T(i \rightarrow j)$ each of which represents the probability of a transition to a state $S_j$ given a current state $S_i$ where $S_i$ and $S_j$ may be the same state or different states, and (c) actual label probabilities wherein each actual label probability $p(y_k|i \rightarrow j)$ indicates the probability that a label $y_k$ is produced by a given phone machine at a given transition from one state to a subsequent state where k is a label identifying notation; each phone machine including (a) means for assigning to each $y_k$ in said each phone machine a single specific value $p'(y_k)$ and (b) means for replacing each actual output probability $p(y_k|i \rightarrow j)$ at each transition in a given phone machine by the single specific value $p'(y_k)$ assigned to the corresponding $y_k$. Preferably, the replacement value is at least as great as the maximum actual label probability for the corresponding $y_k$ label at any transition in a particular phone machine. The fast match embodiments are employed to define a list of on the order of ten to one hundred candidate words selected as the most likely words in the vocabulary to correspond to the incoming labels. The candidate words are preferably subjected to the language model and to the detailed match. By paring the number of words considered by the detailed match to on the order of 1% of the words in the vocabulary, the computational cost is greatly reduced while accuracy is maintained.

The basic fast match simplifies the detailed match by replacing with a single value the actual label probabilities for a given label at all transitions at which the given label may be generated in a given phone machine. That is, regardless of the transition in a given phone machine whereat a label has a probability of occurring, the probability is replaced by a single specific value. The value is preferably an overestimate, being at least as great as the largest probability of the label occurring at any transition in the given phone machine.

By setting the label probability replacement value as the maximum of the actual label probabilities for the given label in the given phone machine, it is assured that the match value generated with the basic fast match is at least as high as the match value that would result from employing the detailed match. In this way, the basic fast match typically overestimates the match value of each phone so that more words are generally selected as candidate words. Words considered candidates according to the detailed match also pass muster in accordance with the basic fast match.

Figure 15:
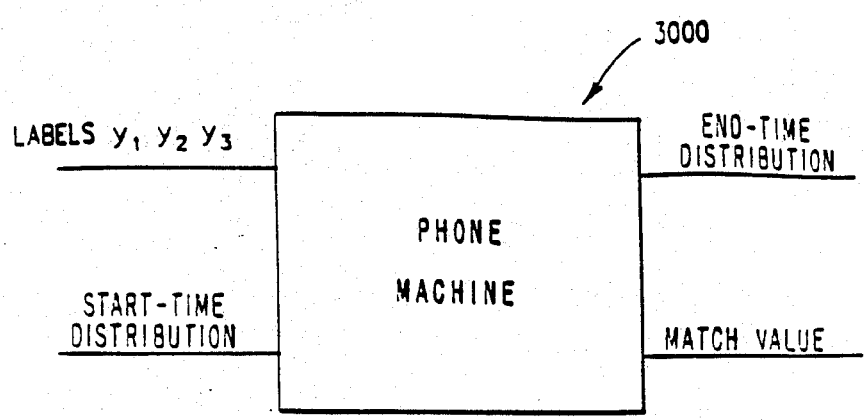
FIG. 15 is a diagram depicting a phone machine.

Referring to FIG. 15, a phone machine 3000 for the basic fast match is illustrated. Labels (also referred to as symbols and fenemes) enter the basic fast match phone machine 3000 together with a start-time distribution. The start-time distribution and the label string input is like that entering the phone machine described hereinabove. It should be realized that the start time may, on occasion, not be a distribution over a plurality of times but may, instead, represent a precise time—for example following an interval of silence—at which the phone begins. When speech is continuous, however, the end-time distribution is used to define the start-time distribution (as is discussed in greater detail hereinbelow). The phone machine 3000 generates an end-time distribution and a match value for the particular phone from the generated end-time distribution. The match score for a word is defined as the sum of match values for component phones—at least the first h phones in the word.

Figure 16:
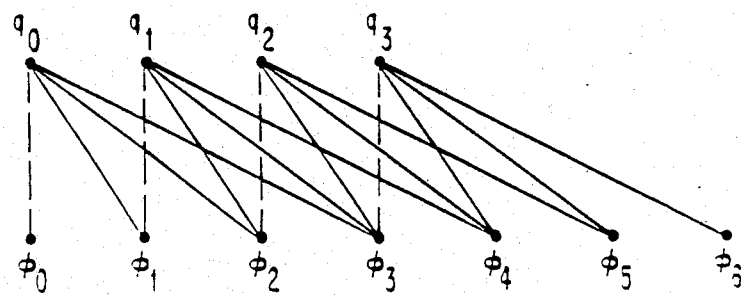
FIG. 16 is a diagram showing start times and end times of a phone given predefined conditions.

Referring now to FIG. 16, a diagram useful in following a basic fast match computation is illustrated. The basic fast match computation is only concerned with the start-time distribution (Q), the number—or length of labels—produced by the phone, and the replacement values $p'_{y_k}$ associated with each label $y_k$. By substituting all actual label probabilities for a given label in a given phone machine by a corresponding replacement value, the basic fast match replaces transition probabilities with length distribution probabilities and obviates the need for including actual label probabilities (which can differ for each transition in a given phone machine) and probabilities of being at a given state at a given time.

In this regard, the length distributions are determined from the detailed match model. Specifically, for each length in the length distribution L, the procedure preferably examines each state individually and determines for each state the various transition paths by which the currently examined state can occur (a) given a particular label length and (b) regardless of the outputs along the transitions. The probabilities for all transition paths of the particular length to each subject state are summed and the sums for all the subject states are then added to indicate the probability of a given length in the distribution. The above procedure is repeated for each length. In accordance with the preferred form of the matching procedure, these computations are made with reference to a trellis diagram as is known in the art Markov modelling. For transition paths which share branches along the trellis structure, the computation for each common branch need by made only once and is applied to each path that includes the common In the diagram of FIG. 16, two limitations are included by way of example. First, it is assumed that the length of labels produced by the phone can be zero, one, two, or three having respective probabilities of $l_0$, $l_1$, $l_2$, and $l_3$. The start time is also limited, permitting only four start times having respective probabilities of $q_0$, $q_1$, $q_2$, and $q_3$. With these limitations, the following equations define the end-time distribution of a subject phone as:

$\Phi_0 = q_0 l_0$ $\Phi_1 = q_1 l_0 + q_0 l_1 p_1$ $\Phi_2 = q_2 l_0 + q_1 l_1 p_2 + q_0 l_2 p_1 p_2$ $\Phi_3 = q_3 l_0 + q_2 l_1 p_3 + q_1 l_2 p_2 p_3 + q_0 l_3 p_1 p_2 p_3$ $\Phi_4 = q_3 l_1 p_4 + q_2 l_2 p_3 p_4 + q_1 l_3 p_2 p_3 p_4$ $\Phi_5 = q_3 l_2 p_4 p_5 + q_2 l_3 p_3 p_4 p_5$ $\Phi_6 = q_3 l_3 p_4 p_5 p_6$

In examining the equations, it is observed that $\Phi_3$ includes a term corresponding to each of four start times. The first term represents the probability that the phone starts at time $t = t_3$ and produces a length of zero labels—the phone starting and ending at the same time. The second term represents the probability that the phone starts at time $t = t_2$, that the length of labels is one, and that a label 3 is produced by the phone. The third term represents the probability that the phone starts at time $t = t_1$, that the length of labels is two (namely labels 2 and 3), and that labels 2 and 3 are produced by the phone. Similarly, the fourth term represents the probability that the phone starts at time $t = t_0$; that the length of labels is three; and that the three labels 1, 2, and 3 are produced by the phone.

Comparing the computations required in the basic fast match with those required by the detailed match suggest the relative simplicity of the former relative to the latter. In this regard, it is noted that the $p'_{y_k}$ value remains the same for each appearance in all the equations as do the label length probabilities. Moreover, with the length and start time limitations, the computations for the later end times become simpler. For example, at $\Phi_6$, the phone must start at time $t = t_3$ and all three labels 4, 5, and 6 must be produced by the phone for that end time to apply.

In generating a match value for a subject phone, the end time probabilities along the defined end-time distribution are summed. If desired, the log of the sum is taken to provide the expression:

match value = $\log_{10}(\Phi_0 + \cdots + \Phi_6)$

As noted previously, a match score for a word is readily determined by summing the match values for successive phones in a particular word.

Figure 17:
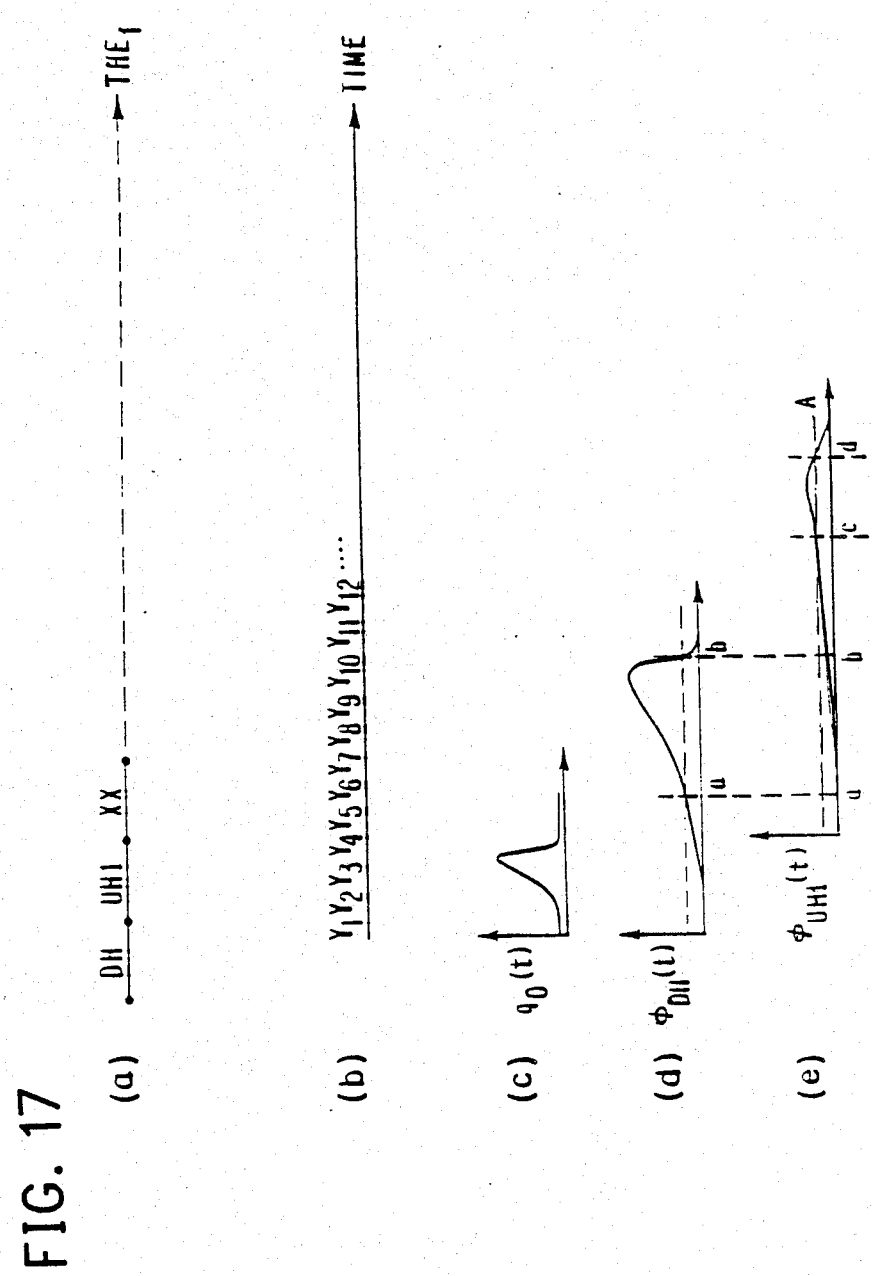
FIG. 17, including parts (a) through (e), shows the relationship between start times and end times in successive phones.

In describing the generating of the start time distribution, reference is made to FIG. 17. In FIG. 17(a), the word "THE"$_1$ is repeated, broken down into its component phones. In FIG. 17(b;l), the string of labels is depicted over time. In FIG. 17(c), a first start-time distribution is shown. The first start-time distribution has been derived from the end-time distribution of the most recent previous phone (in the previous word which may include a "word" of silence). Based on the label inputs and the start-time distribution of FIG. 17(c), the end-time distribution for the phone DH, $\Phi_{DH}$, is generated. The start-time distribution for the next phone, UH, is determined by recognizing the time during which the previous phone end-time distribution exceeded a threshold (A) in FIG. 17(d). (A) is determined individually for each end-time distribution. Preferably, (A) is a function of the sum of the end-time distribution values for a subject phone. The interval between times a and b thus represents the time during which the start-time distribution for the phone UH is set. (See FIG. 17(e).) The interval between times c and d in FIG. 17(e) corresponds to the times between which the end-time distribution for the phone DH exceeds the threshold (A) and between which the start-time distribution of the next phone is set. The values of the start-time distribution are obtained by normalizing the end-time distribution by, for example, dividing each end-time value by the sum of the end-time values which exceed the threshold (A).

The basic fast match phone machine 3000 has been implemented in a Floating Point Systems Inc. 190L with an APAL program. Other hardware and software may also be used to develop a specific form of the matching procedure by following the teachings set forth herein.

G. Constructing Phonetic Baseforms

One type of Markov model phone machine which can be used in forming baseforms is based on phonetics. That is, each phone machine corresponds to a given phonetic sound.

For a given word, there is a sequence of phonetic sounds each having a respective phone machine corresponding thereto. Each phone machine includes a number of states and transitions therebetween, some of which can produce a feneme output and some (referred to as null transitions) which cannot. Statistics relating to each phone machine—as noted hereinabove—include (a) the probability of a given transition occurring and (b) the likelihood of a particular feneme being produced at a given transition. Preferably, at each non-null transition there is some probability associated with each feneme. In a feneme alphabet shown in Table 1, there are about 200 fenemes. A phone machine used in forming phonetic baseforms is illustrated in FIG. 4. A sequence of such phone machines is provided for each word. The values of the probability items are determined according to the present invention. Transition probabilities and feneme probabilities in the various phonetic phone machines are determined during training by noting the feneme string(s) generated when a known phonetic sound is uttered at least once and by applying the well-known forward-backward algorithm.

A sample of statistics for one phone identified as phone DH are set forth in Table 2. As an approximation, the label output probability distribution for transitions tr1, tr2, and tr8 of the phone machine of FIG. 4 are represented by a single distribution; transitions tr3, tr4, tr5, and tr9 are represented by a single distribution; and transitions tr6, tr7, and tr10 are represented by a single distribution. This is shown in Table 2 by the assignment of arcs (i.e. transitions) to the respective columns 4, 5, or 6. Table 2 shows the probability of each transition and the probability of a label (i.e. feneme) being generated in the beginning, middle, or end, respectively, of the phone DH. For the DH phone, for example, the probability of the transition from state $S_1$ to state $S_2$ is stored as 0.07243. The probability of transition from state $S_1$ to state $S_4$ is 0.92757. (In that these are the only two possible transitions from the initial state, their sum equals unity.) As to label output probabilities, the DH phone has a 0.091 probability of producing the feneme AE13 (see Table 1) at the end portion of the phone, i.e. column 6 of Table 2. Also in Table 2 there is a count associated with each node (or state). The node count is indicative of the number of times during training that the phone was in the corresponding state. Statistics as in Table 2 are found for each phone machine.

The arranging of phonetic phone machines into a word baseform sequence is typically performed by a phonetician and is normally not not done automatically.

H. Alternative Embodiments

Thus, while the invention has been described with reference to preferred embodiments thereof, it will be understood by those skilled in the art that various changes in form and details may be made without departing from the scope of the invention.

TABLE 1

THE TWO LETTERS ROUGHLY REPRESENT
THE SOUND OF THE ELEMENT.
TWO DIGITS ARE ASSOCIATED WITH VOWELS:
FIRST: STRESS OF SOUND
SECOND: CURRENT IDENTIFICATION NUMBER
ONE DIGIT ONLY IS ASSOCIATED
WITH CONSONANTS:
SINGLE DIGIT: CURRENT IDENTIFICATION NUMBER

| | | | | |
|---|---|---|---|---|
| 001 AA11 | 029 BX2- | 057 EH02 | 148 TX5- | 176 XX11 |
| 002 AA12 | 030 BX3- | 058 EH11 | 149 TX6- | 177 XX12 |
| 003 AA13 | 031 BX4- | 059 EH12 | 150 UH01 | 178 XX13 |
| 004 AA14 | 032 BX5- | 060 EH13 | 151 UH02 | 179 XX14 |
| 005 AA15 | 033 BX6- | 061 EH14 | 152 UH11 | 180 XX15 |
| 006 AE11 | 034 BX7- | 062 EH15 | 153 UH12 | 181 XX16 |
| 007 AE12 | 035 BX8- | 126 RX1- | 154 UH13 | 182 XX17 |
| 008 AE13 | 036 BX9- | 127 SH1- | 155 UH14 | 183 XX18 |
| 009 AE14 | 037 DH1- | 128 SH2- | 156 UU11 | 184 XX19 |
| 010 AF15 | 038 DH2- | 129 SX1- | 157 UU12 | 185 XX2- |
| 011 AW11 | 039 DQ1- | 130 SX2- | 158 UXG1 | 186 XX20 |
| 012 AW12 | 040 DQ2- | 131 SX3- | 159 UXG2 | 187 XX21 |
| 013 AW13 | 041 DQ3- | 132 SX4- | 160 UX11 | 188 XX22 |
| 014 AX11 | 042 DQ4- | 133 SX5- | 161 UX12 | 189 XX23 |
| 015 AX12 | 043 DX1- | 134 SX6- | 162 UX13 | 190 XX24 |
| 016 AX13 | 044 DX2- | 135 SX7- | 163 VX1- | 191 XX3- |
| 017 AX14 | 045 EE01 | 136 TH1- | 164 VX2- | 192 XX4- |
| 018 AX15 | 046 EE02 | 137 TH2- | 165 VX3- | 193 XX5- |
| 019 AX16 | 047 EE11 | 138 TH3- | 166 VX4- | 194 XX6- |
| 020 AX17 | 048 EE12 | 139 TH4- | 167 WX1- | 195 XX7- |
| 021 BQ1- | 049 EE13 | 140 TH5- | 168 WX2- | 196 XX8- |
| 022 BQ2- | 050 EE14 | 141 TQ1- | 169 WX3- | 197 XX9- |
| 023 BQ3- | 051 EE15 | 142 TQ2- | 170 WX4- | 198 ZX1- |
| 024 BQ4- | 052 EE16 | 143 TX3- | 171 WX5- | 199 ZX2- |
| 025 BX1- | 053 EE17 | 144 TX1- | 172 WX6- | 200 ZX3- |
| 026 BX10 | 054 EE18 | 145 TX2- | 173 WX7- | |
| 027 BX11 | 055 EE19 | 146 TX3- | 174 XX1- | |
| 028 BX12 | 056 EH01 | 147 TX4- | 175 XX10 | |

TABLE 2

| PHONE | 3 | DH | 7 NODES. | 13 ARCS. | 3 ARC LABELS. | | | | | |
|---|---|---|---|---|---|---|---|---|---|---|
| NODE | 1 | 2 | 3 | 4 | 5 | 6 | 7 | | | |
| LABEL | 8 | 9 | 10 | 11 | 12 | 13 | 0 | | | |
| COUNT | 31.0 | 1.7 | 1.7 | 119.1 | 115.4 | 120.1 | 0.0 | | | |
| ARC | 1→2 | 1→4 | 1→7 | 2→3 | 2→7 | 3→7 | 3→7 | 4→4 | 4→5 | 5→ | 5→6 | 6→6 | 6→7 |
| LABEL | 4 | 4 | NULL | 5 | NULL | 6 | NULL | 4 | 5 | | 5 | 6 | 6 |

TABLE 2-continued

| | | | | | | | | | | | | |
|---|---|---|---|---|---|---|---|---|---|---|---|---|
| PROB | 0.07243 | 0.92757 | 0.00000 | 0.99259 | 0.00741 | 0.93982 | 0.06018 | 0.75179 | 0.24821 | 0.7438 | 0.25611 | 0.75370 | 0.24630 |
| LABEL- | 4 | 5 | 6 | | | | | | | | | |
| COUNT | 120.8 | 146.4 | 121.6 | | | | | | | | | |
| AE13 | | | 0.091 | | | | | | | | | |
| BX10 | 0.030 | | | | | | | | | | | |
| BX3_ | 0.130 | | | | | | | | | | | |
| BX8_ | 0.011 | 0.086 | | | | | | | | | | |
| DH1_ | 0.020 | 0.040 | 0.013 | | | | | | | | | |
| DQ2_ | 0.011 | 0.052 | | | | | | | | | | |
| EH01 | 0.010 | 0.014 | 0.167 | | | | | | | | | |
| EH02 | | | 0.026 | | | | | | | | | |
| EH11 | | | 0.015 | | | | | | | | | |
| EH13 | | | 0.012 | | | | | | | | | |
| EH14 | | | 0.062 | | | | | | | | | |
| ER14 | | | 0.024 | | | | | | | | | |
| FX2_ | | 0.045 | | | | | | | | | | |
| FX3_ | | 0.148 | | | | | | | | | | |
| GX2_ | | 0.013 | | | | | | | | | | |
| GX5_ | 0.148 | | | | | | | | | | | |
| GX6_ | 0.246 | 0.023 | | | | | | | | | | |
| HX1_ | | 0.011 | | | | | | | | | | |
| IX04 | 0.011 | | 0.020 | | | | | | | | | |
| IX13 | 0.025 | | 0.026 | | | | | | | | | |
| KQ1_ | | 0.014 | 0.024 | | | | | | | | | |
| KX2_ | | 0.013 | | | | | | | | | | |
| MX2_ | 0.029 | 0.043 | 0.012 | | | | | | | | | |
| NX3_ | 0.019 | | | | | | | | | | | |
| NX5_ | 0.049 | | | | | | | | | | | |
| NX6_ | | 0.017 | 0.012 | | | | | | | | | |
| OU14 | | | 0.023 | | | | | | | | | |
| PQ1_ | 0.029 | 0.018 | | | | | | | | | | |
| TR2_ | | 0.020 | | | | | | | | | | |
| TQ3_ | | 0.017 | | | | | | | | | | |
| UH01 | | | 0.020 | | | | | | | | | |
| UH02 | 0.025 | 0.082 | 0.109 | | | | | | | | | |
| UXG2 | | | 0.016 | | | | | | | | | |
| UX12 | | | 0.062 | | | | | | | | | |
| UX13 | | | 0.183 | | | | | | | | | |
| VX1_ | | | 0.016 | | | | | | | | | |
| VX3_ | 0.041 | 0.283 | 0.016 | | | | | | | | | |
| WX2 | 0.023 | 0.014 | | | | | | | | | | |
| XX23 | 0.072 | | | | | | | | | | | |
| OTHER | 0.073 | 0.047 | 0.048 | | | | | | | | | |

We claim:

1. In a system for decoding a vocabulary word from outputs selected from an alphabet of outputs in response to a communicated word input wherein each word in the vocabulary is represented by a baseform of at least one probabilistic finite state model and wherein each probabilistic model has transition probability items and output probability items and wherein a probability value is stored for each of at least some probability items, a method of determining probability values comprising the step of:

biassing at least some of the stored probability values to enhance the likelihood that outputs generated in response to communication of a known word input are produced by the baseform for the known word relative to the respective likelihood of the generated outputs being produced by the baseform for at least one other word.

2. A method of decoding a vocabulary word from outputs selected from an alphabet of outputs in response to a communicated word input, wherein each word in the vocabulary is represented by at least one probabilistic model, each probabilistic model having (i) stored transition probability values each representing the probability of a corresponding transition in a model being taken and (ii) stored output probability values each representing the probability of a corresponding output probability being produced at a given transition or transitions in a model, the method comprising the steps of:

(a) generating outputs in response to the communication of a known word input; and
(b) biassing at least some of the stored values to enhance the likelihood that the generated outputs are produced by the baseform for the known word relative to the respective likelihood of the generated outputs being produced by the baseform for at least one other word.

3. The method of claim 2 comprising the further step of:

(c) in response to the utterance of an unknown word and the generating of label outputs in response thereto, determining the likelihood of words in the vocabulary based on the values of the probability items after biassing; and wherein each output corresponds to a label generated by an acoustic processor, said output generating step including the step of:

(d) generating a string of labels in response to a speech input, each label corresponding to a distinct sound type and being selected from an alphabet of labels.

4. In a speech recognition system in which labels, from an alphabet of labels, are generated by an acoustic processor at successive label times in response to a speech input and in which words or portions thereof are represented probabilistically by Markov models, wherein each Markov model is characterized by (i) states, (ii) transitions between states, and (iii) probabiltity items wherein some probability items have previously defined probability values $\theta'$ which correspond to the likelihood of a transition in a given model being taken and wherein other probability items have previously defined probability values $\theta'$ which correspond to the likelihood of a specific label being produced at a transition of one or more predefined transitions in a given model, a method of evaluating counts from which enhanced probability values are derived comprising the steps of:

(a) storing for each probability item a preliminary value $\theta'$;

(b) defining and storing a set of counts wherein each probability item is determined from the value of at least one count associated therewith in storage, each count in the set having a value corresponding to the probability of a specific transition $\tau i$ being taken from a specific state Sj given (i) a specific label interval time t, (ii) a specific string of generated labels, and (iii) the stored $\theta'$ values;

(c) uttering a known subject word and generating outputs in response thereto;

(d) selecting an incorrect word other than the known word and, for each count used in deriving the value of a probability item in said incorrect word model, determining a minus count value from the generated outputs of the uttered known word; and (e) defining an adjusted count value wherein the stored value of each count serves as an addend and the minus value of each count serves as a subtrahend thereof.

5. The method of claim 4 comprising the further steps of:

(f) for each count used in deriving a probability item in the known word model, determining a plus count value from the generated outputs of the uttered known word;

(g) the plus count value of a subject count serving as an addend in defining the adjusted count value for the subject count;

the adjusted value of a subject count being determined by adding the stored value and plus count value and subtracting the minus count value.

6. The method of claim 5 comprising the further steps of:

(h) repeating steps (c) through (g) for each word in a predefined script; and (j) recomputing the values of the probability items based on the most recent adjusted values of the counts after step (h).

7. The method of claim 6 wherein each transition probability item $Pr(\tau_i|S_j)$ is defined as:

$$Pr\left(\tau_i|S_j\right) = \left[\sum_{t=1}^{T+1} Pr(S_j,\tau_i|Y,t)\right]$$

divided by $$\sum_{k=1}^{K} \sum_{t=1}^{T+1} Pr(S_j,\tau_k|Y,t)$$

where Y is a string of labels; and wherein each label output probability item $Pr(f_h|\tau_i,S_j)$ is defined as:

$$\Sigma_{t:y_t=f_h} Pr'(S_j,\tau_i|Y,t)$$

divided by $$\sum_{t=1}^{T} Pr'(S_j,\tau_i|Y,t)$$

where $f_h$ corresponds to a specific label selected from the alphabet of labels and $y_t$ corresponds to the label generated at a time interval t.

8. The method of claim 7 wherein the selecting of an incorrect word comprises the steps of:

(k) forming an ordered list of candidate words from the words in the vocabulary; and (l) choosing, as the selected word, the word having the highest likelihood of being wrongly selected as the uttered known subject word.

9. The method of claim 8 wherein said list forming step includes the steps of:

characterizing each word as a sequence of phonetic elements, wherein each phonetic element has (i) a start-time distribution of probabilities $q_n$ corresponding to respective successive start times $t_n$, (ii) a plurality of states between which transitions occur, (iii) a plurality of transition probabilities, each indicating the probability that a given transition in a given phonetic element occurs, (iv) a plurality of actual label probabilities, each actual output probability indicating the probability that a particular phonetic element generates a particular label at a particular transition in the particular phonetic element; and forming an approximate match for a subject word including the steps of:

replacing all actual label probabilities associated with a given label generated by a given phonetic element at any transition therein with a corresponding specific replacement value;

determining for one phonetic element after another in the subject word a probability $\Phi_n$ of a phonetic element ending at a respective one of a plurality of successive end times $t_n$ as a function of start-time distribution, the probability of the phonetic element generating a label string of each of various lengths, and the replacement value $p'(y_k)$ for each respective label $y_k$ that is to be generated by the phonetic element to produce the incoming string of labels;

characterizing the label length distribution as uniform between a minimum length and a maximum length with the probability elsewhere being set as zero;

each $\Phi_n$ thereby being a function of start-time distribution, the uniform probability for each length between the minimum length and the maximum length, and the replacement value $p'(y_k)$ for each respective label $y_k$ that is to be generated by the phonetic element to produce the incoming string of labels;

combining the values for the successive $\Phi_n$'s to derive a match value for the phonetic element corresponding thereto; and combining match values for successive phonetic elements in a subject word to provide a word match score; and forming a list of candidate words in order of word match scores, at least most of the words in the vocabulary being excluded from the formed list.

10. The method of claim 8 comprising the further step of:

(m) determining the likelihood of the correct word model producing the generated outputs;

(n) determining the likelihood of the selected incorrect word model producing the generated outputs;

(p) comparing the likelihoods determined in steps (m) and (n); and (q) conditioning the defining of an adjusted count value on whether the correct word likelihood fails to exceed the incorrect word likelihood by a prescribed increment.

11. The method of claim 10 wherein determining the minus count value for a subject count includes the step of:

(r) determining a minus cumulative count value for each probability item in the incorrect word baseform, the minus cumulative count value being based on the outputs generated in response to the utterance of the known subject word and corresponding to a specific transition $\tau_i$ being taken from a specific state $S_j$ at all label interval times t in the word model of the selected incorrect word, where the probability items have previously defined values.

12. The method of claim 11 wherein step (r) includes the step of:

(s) applying the forward-backward algorithm to the word model for the selected incorrect word based on the outputs generated in response to the utterance of the known subject word to determine minus cumulative count values.

13. The method of claim 11 wherein determining the plus count value for a subject count includes the step of:

(t) determining a plus cumulative count value for each probability item in the correct word baseform, the plus cumulative count value being based on the outputs generated in response to the utterance of the known subject word and corresponding to a specific transition $\tau_i$ being taken from a specific state $S_j$ at all label interval times t in the word model of the correct word, where the probability items have previously defined values.

14. The method of claim 13 wherein step (t) includes the step of:

(u) applying the forward-backward algorithm to the word model for the selected incorrect word based on the outputs generated in response to the utterance of the known subject word to determine the plus cumulative count values.

15. The method of claim 14 wherein steps (a) through (u) comprise a cycle that is successively repeated for a predefined number of iterations;

each cycle being performed with stored values updated in the most recent previous cycle.

16. The method of claim 5 wherein the determining of the minus count values includes the steps of:

(v) for a subject count used in deriving a probability value for a probability item in the incorrect word, determining a first value indicating the expected occurrence of the event corresponding to the subject count in the model of the incorrect word based on the outputs generated in response to utterance of the known word;

(w) scaling the first value by a predefined amount;

(x) the scaled value representing the minus count value for the subject count; and (y) repeating steps (v) through (x), until each count used in deriving a probability value for a probability item in the incorrect word model has been the subject count in at least one repetition.

17. The method of claim 16 wherein the determining of the plus count values includes the steps of:

(aa) for a subject count used in deriving a probability value for a probability item in the incorrect word, determining a first value of the event corresponding to the subject count in the model of the incorrect word based on the outputs generated in response to utterance of the known word;

(bb) scaling the first value by a predefined amount;

(cc) the scaled value representing the plus count value for the subject count; and p1 (dd) repeating steps (aa) through (cc), until each count used in deriving a probability value for a probability item in the incorrect word model has been the subject count in at least one repetition.

18. The method of claim 4 comprising the further step of:

(ee) determining maximum likelihood training values for counts which maximize the expression $Pr(Y|M)$ where Y is a string of labels generated during initial training and M is a defined Markov model that includes maximum likelihood values for the probability items thereof;

(ff) the adjustment of count values starting with the maximum likelihood training values as the current values.

19. The method of claim 4 comprising the further step of:

(gg) determining maximum likelihood training values for probability items which maximize the expression $Pr(Y|M)$ where Y is a string of labels generated during initial training and M is a defined Markov model that includes maximum likelihood values for the probability items thereof;

(hh) the adjustment of probability items starting with the maximum likelihood training values as the computed values of step (b).

20. The method of claim 19 wherein said list forming step includes the steps of:

characterizing each word as a sequence of phonetic elements, wherein each phonetic element has (i) a start-time distribution of probabilities $q_n$ corresponding to respective successive start times $t_n$, (ii) a plurality of states between which transitions occur, (iii) a plurality of transition probabilities, each indicating the probability that a given transition in a given phonetic element occurs, (iv) a plurality of actual label probabilities, each actual output probability indicating the probability that a particular phonetic element generates a particular label at a partiular transition in the particular phonetic element; and forming an approximate match for a subject word including the steps of:

replacing all actual label probabilities associated with a given label generated by a given phonetic element at any transition therein with a corresponding specific replacement value;

determining for one phonetic element after another in the subject word the probability $\Phi_n$ of a phonetic element ending at a respective one of a plurality of successive end times $t_n$ as a function of start-time distribution, the probability of the phonetic element generating a label string of each of various lengths, and the replacement value $p'(y_k)$ for each respective label $y_k$ that is to be generated by the phonetic element to produce the incoming string of labels;

characterizing the label length distribution as uniform between a minimum length and a maximum length with the probability elsewhere being set as zero;

each $\Phi_n$ thereby being a function of start-time distribution, the uniform probability for each length between the minimum length and the maximum length, and the replacement value $p'(y_k)$ for each respective label $y_k$ that is to be generated by the phonetic element to produce the incoming string of labels;

combining the values for the successive $\Phi_n$'s to derive a match value for the phonetic element corresponding thereto; and combining match values for successive phonetic elements in a subject word to provide a word match score; and forming a list of candidate words in order of word match scores, at least most of the words in the vocabulary being excluded from the formed list.

21. In a speech recognition system which decodes a vocabulary word from a string of output labels, each output label being selected from an alphabet of output labels in response to an uttered word input wherein each word in the vocabulary is represented by a baseform of at least one probabilistic finite state machine and wherein each probabilistic machine has transition probability items and output probability items, apparatus for determining probability values for probability items comprising:

means for storing a current probability value for each probability item; and means for biasing the stored current probability values to enhance the likelihood that outputs generated in response to the utterance of a known spoken word input are produced by the baseform for the known word relative to the respective likelihood of the generated outputs being produced by the baseform for at least one other word.

* * * * *